(12) United States Patent
Venugopal et al.

(10) Patent No.: US 8,570,875 B2
(45) Date of Patent: *Oct. 29, 2013

(54) DETERMINING COLLOCATIONS WITH AN ACCESS TRANSPORT MANAGEMENT SYSTEM (ATMS)

(75) Inventors: Nandagopal Venugopal, Plano, TX (US); Thomas P Newcomer, Rowlett, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 565 days.

This patent is subject to a terminal disclaimer.

(21) Appl. No.: 12/413,965

(22) Filed: Mar. 30, 2009

(65) Prior Publication Data

US 2010/0023607 A1 Jan. 28, 2010

Related U.S. Application Data

(63) Continuation-in-part of application No. 12/178,165, filed on Jul. 23, 2008.

(51) Int. Cl.
| | | |
|---|---|---|
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |

(52) U.S. Cl.
USPC ............ 370/238; 370/254; 455/445; 709/229

(58) Field of Classification Search
USPC .................. 709/238–244, 223–226
See application file for complete search history.

(56) References Cited

U.S. PATENT DOCUMENTS

| | | | |
|---|---|---|---|
| 5,508,999 A | 4/1996 | Cox et al. | |
| 5,564,021 A | 10/1996 | Qiu et al. | |
| 5,809,282 A * | 9/1998 | Cooper et al. | ................. 709/226 |
| 6,094,417 A | 7/2000 | Hansen et al. | |
| 6,151,305 A | 11/2000 | Chen | |
| 6,240,463 B1 * | 5/2001 | Benmohamed et al. | ....... 709/238 |
| 6,567,822 B1 | 5/2003 | Cudahy et al. | |
| 7,583,795 B1 * | 9/2009 | Florence et al. | .............. 379/133 |
| 2006/0178918 A1 | 8/2006 | Mikurak | |
| 2008/0140676 A1 | 6/2008 | Silverstone et al. | |
| 2009/0063251 A1 | 3/2009 | Rangarajan et al. | |
| 2009/0070402 A1 | 3/2009 | Rose et al. | |
| 2009/0073034 A1 | 3/2009 | Lin | |
| 2009/0228309 A1 * | 9/2009 | Moll | .................................. 705/7 |
| 2009/0292629 A1 * | 11/2009 | Lynch et al. | .................... 705/30 |

OTHER PUBLICATIONS

Co-pending U.S. Appl. No. 12/178,165 entitled "Mixed Integer Programming Model for Minimizing Leased Access Network Costs" by Nandagopal Venugopal et al., filed Jul. 23, 2008.

* cited by examiner

*Primary Examiner* — Ian N Moore
*Assistant Examiner* — Jackie Zuniga

(57) ABSTRACT

A device receives network configuration information from a network, determines a new capacity model of the network based on the network configuration information, and constructs a mixed integer programming (MIP) model based on the new capacity model. The device also calculates an optimal baseline solution, that minimizes network costs, using the mixed integer programming (MIP) model, performs a collocation optimization procedure on the optimal baseline solution to produce an optimal collocation solutions for the network, and provides the optimal network collocation solutions to the network for implementation.

23 Claims, 23 Drawing Sheets

FIG. 16

| DESCRIPTION | BASELINE VALUE | INTERACTIVE VALUE |
|---|---|---|
| Total # DS1s moved | 33 | 51 |
| Total # DS1s re-homed | 21 | 7 |
| # of new DS3s | 1 | 5 |
| # of DS3s re-homed | 3 | 5 |
| Cost of new DS3s | $1537.98 | $4648.95 |
| Total DS1 savings | $8186.84 | $11536.74 |
| Total DS3 savings | $1673.72 | $4890.75 |
| Incremental OCn savings | N/A | 0 |
| Total incremental savings | N/A | $6566.93 |

FIG. 17

| LATA | # Circuits | DS1 Inventory Cost | Time | Baseline Savings | | Incremental Savings | | Total Incr. Savings | Total Savings |
|---|---|---|---|---|---|---|---|---|---|
| | | | | DS1 | DS3 | DS1 | DS3 | | |
| 734 | 88 | $24,168 | 00:00:26 | $8,187 | $1,674 | $2,055 | $1,087 | $3,142 | $13,001 |
| 478 | 158 | $42,978 | 02:00:01 | $27,318 | $38,841 | $3,756 | $2,025 | $5,781 | $71,940 |
| 220 | 300 | $72,928 | 00:02:21 | $22,966 | $0 | $12,145 | $2,463 | $14,608 | $37,573 |
| 672 | 384 | $100,359 | 04:34:00 | $40,446 | $42,505 | $14,081 | $20,437 | $34,518 | $117,468 |
| 356 | 448 | $110,747 | 02:59:48 | $57,394 | $24,576 | $4,222 | $0 | $4,222 | $86,192 |

DETERMINING COLLOCATIONS WITH AN ACCESS TRANSPORT MANAGEMENT SYSTEM (ATMS)

RELATED APPLICATION

This application is a continuation-in-part (CIP) of U.S. patent application Ser. No. 12/178,165, filed Jul. 23, 2008, the disclosure of which is incorporated by reference herein in its entirety.

BACKGROUND

An access network (e.g., a local access and transport area (LATA)) refers to series of wires, cables, and equipment lying between a consumer/business telephone termination point (a point at which a telephone connection reaches a customer) and a local telephone exchange. The local telephone exchange contains banks of automated switching equipment to direct a call or connection to the consumer. The access network is perhaps one of the oldest assets a telecommunication provider owns, and is constantly evolving, growing as new customers are connected and as new services are offered. This makes the access network one of the most complex networks in the world to maintain and keep track of.

Access transport management systems (ATMSs) provide network engineers with core functionality to manage a nationwide access network (e.g., a telecommunications network). Access transport management systems automate the process of identifying local exchange carrier (LEC) and competitive local exchange carrier (CLEC) access circuits that have sub-optimal routes, and moving such circuits to less costly routes and/or facilities. Access transport management systems may include sets of procedures that conform to user-defined business logic. Depending on given optimization parameters, access transport management systems may execute a suitable set of procedures against each circuit in order to determine cost-saving opportunities. For example, in the case of digital signal 1 (DS1) line optimization, access transport management systems may use entrance facility (e.g., an entrance to a building for both public and private network service cables, including antenna transmission lines) spares to discover zero-mile digital signal 3 (DS3) lines, subtending DS1 lines (e.g., subtending allows a node to feed traffic to another node upstream), and/or swinging DS1 lines.

A collocation is a space, leased at a local exchange carrier's (LEC's) wire center, where a telecommunication provider may place transmission equipment, such as add/drop multiplexers (ADMs), light terminating equipment (LTE), etc. The telecommunication provider's long distance network is extended beyond their point of presence (POP) to the collocations, thereby eliminating the need to lease capacity from the LEC to transport circuits from their POPs to the collocations. At a collocation, a telecommunication provider's customer circuit is handed off to the LEC, which then carries the circuit to its final destination within its territory. The telecommunication provider incurs access costs, payable to the LEC, for this service. However, current access transport management systems are unable to propose new collocations for access networks and to identify optimal collocation locations for access networks.

BRIEF DESCRIPTION OF THE DRAWINGS

FIG. 16 illustrates a diagram of a portion of an exemplary collocation comparison report capable of being generated and/or maintained by the device depicted in FIG. 3;

FIG. 17 depicts a diagram of a portion of an exemplary collocation optimization versus baseline report capable of being generated and/or maintained by the device illustrated in FIG. 3; and FIGS. 18-23 illustrate flow charts of an exemplary process for determining collocations with an access transport management system (ATMS) according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable an access transport management system (ATMS) to perform a collocation analysis that determines collocations for an access network. The systems and/or methods may assist network engineers in identifying optimal collocation locations in an access network (e.g., a LATA), and may rearrange access circuits while simultaneously considering the proposed new collocations. The systems and/or methods may provide a mixed integer programming (MIP) model that may support decision making for the complex collocation analysis. The MIP model may either automatically suggest a best set of new collocations or evaluate candidate collocations designated by network engineers. The systems and/or methods may provide a baseline of savings (e.g., using existing collocations) for the existing access network, which may permit calculation of incremental savings once the new collocations are commissioned.

In one implementation, for example, the systems and/or methods may receive network configuration information from a network (e.g., an access network), and may determine a new capacity model of the network based on the network configuration information. The systems and/or methods may construct a mixed integer programming (MIP) model from the determined new capacity model, and may calculate an optimal baseline solution, minimizing network costs, using the MIP model. The systems and/or methods may perform a collocation optimization procedure against an existing baseline configuration of the access network (e.g., as provided by the optimal baseline solution) to produce optimal collocation solutions, and may implement (e.g., within the access network) and/or store the optimal collocation solutions.

Figure 1:
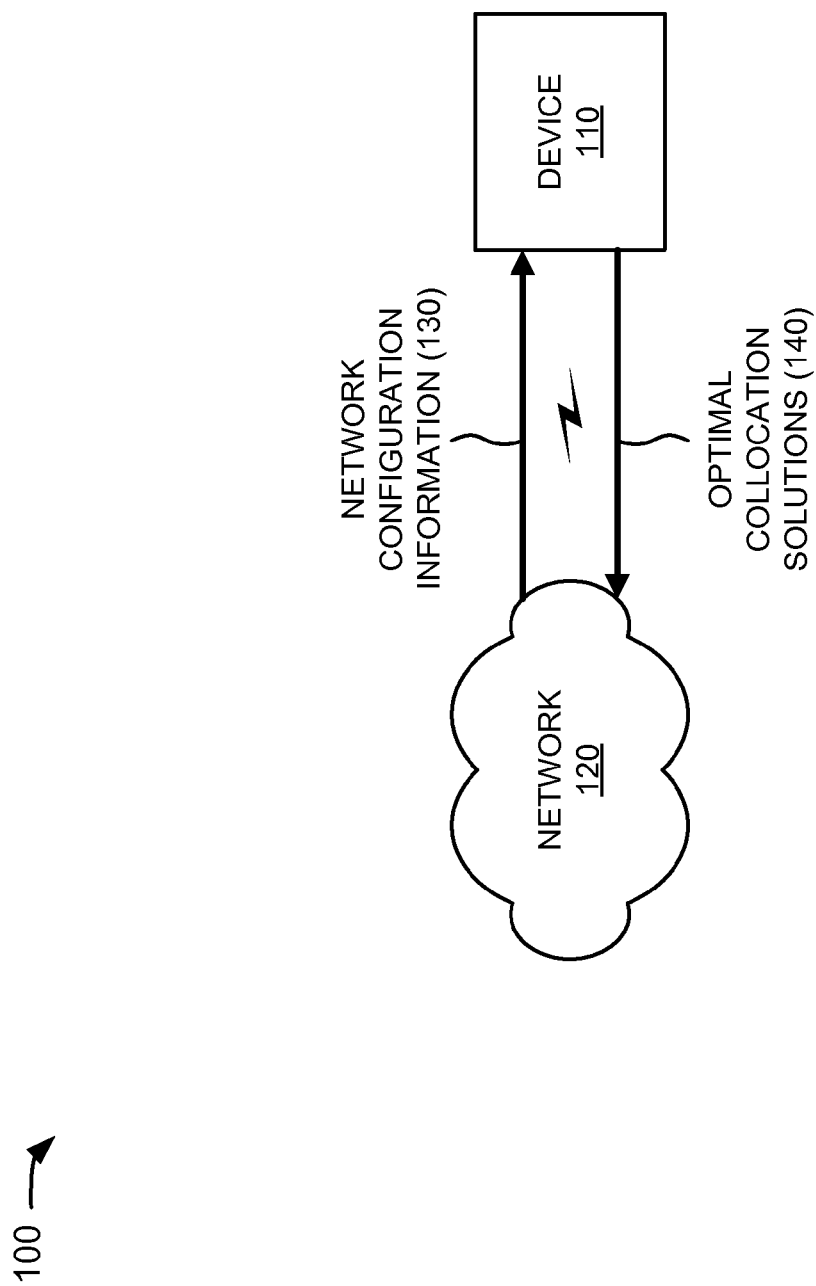
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a device 110 interconnected with a network 120. Components of network 100 may interconnect via wired and/or wireless connections. A single device 110 and network 120 have been illustrated in FIG. 1 for simplicity. In practice, there may be more devices 110 and/or networks 120. Also, in some instances, one or more of the components of network 100 may perform one or more functions described as being performed by another one or more of the components of network 100.

Device 110 may include a lap top or notebook computer, a personal computer, a workstation, a server, or other types of computation or communication devices, threads or processes running on these devices, and/or objects executable by these devices. In one implementation, device 110 may include a computation or communication device that gathers, processes, searches, and/or provides information in a manner described herein. For example, device 110 may include an access transport management system that utilizes a mixed integer programming (MIP) model to optimize large-scale access networks (e.g., network 120) in minimal computation time. Further details of device 110 are provided below in connection with, for example, FIGS. 2-12.

Network 120 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, an access network, a nationwide access network, or a combination of networks. In one implementation, network 120 may include a telecommunication network with one or more interconnected network elements. Each of the network elements may include a data transfer device, such as a gateway, a router, a switch (e.g., an asynchronous transfer mode (ATM) switch), a firewall, a network interface card (NIC), a hub, a bridge, a proxy server, an optical add-drop multiplexer (OADM), a line access multiplexer (LAM), a multiplexer, a permanent or private virtual circuit (PVC), an entrance facility, a collocation, an end office, links provided between any of the aforementioned devices, or some other type of device that processes and/or transfers data. In one example, one or more of the network elements may be capable of establishing an end-to-end path between a telephone termination point (a point at which a telephone connection reaches a customer) and a local telephone exchange.

As further shown in FIG. 1, device 110 may receive network configuration information 130 from network 120. Network configuration information 130 may include information associated with network 120, such as the number of network elements, operational states of the network elements, routing information, interconnection information (e.g., wires, cables, etc. interconnecting the network elements), cost information (e.g., costs associated with routes provided between network elements), user-defined inputs (e.g., user-defined collocation locations), etc. Device 110 may utilize network configuration information 130 to create a logical network that models the physical devices (e.g., network elements) and/or interconnections associated with network 120. Device 110 may map network 120 to the logical network (e.g., based on predefined rules) so that device 110 may calculate optimal collocation solutions 140 for network 120.

The logical network may include nodes (e.g., that model the network elements of network 120) and arcs (e.g., that model the interconnections between the network elements of network 120). The nodes may include a source node (e.g., a source of a network flow), a demand node (e.g., a receiver of the network flow), and/or a transshipment node (e.g., that passes the network flow between the source node and the demand node). If a segment pricing is available between a pair of nodes, the nodes may be linked by an arc that represents a possibility of establishing an access line on that segment. Arcs may serve as a carrier of network flows. The amount of network flow carried by an arc may be subject to a cost, lower bound requirements, and upper bound requirements associated with that arc. For example, a DS1 circuit may include a single commodity flow that may depart from a source node and may arrive at a demand node along a path defined by arcs.

In one implementation, device 110 may construct a MIP model from the logical network created based on network configuration information 130. Device 110 may calculate an optimal baseline solution (e.g., that minimizes costs associated with routing traffic (e.g., data, datagrams, etc.) by network 120) using the MIP model. For example, device 110 may determine optimal locations to install collocations and rearrange access circuits (e.g., in network 120) at a least total expense using the MIP model. Device 110 may perform a collocation optimization procedure against an existing baseline configuration of the access network (e.g., as provided by the optimal baseline solution) to produce optimal collocation solutions 140. Optimal collocation solutions 140 may include information for identifying new collocation locations and for performing network 120 planning in an optimal way (e.g., in a manner that minimizes access transport costs). Device 110 may add new integer variables and constraints to recognize additional cost saving opportunities afforded by establishment of the new collocations. Device 110 may store optimal collocation solutions 140, and/or, as shown in FIG. 1, may provide optimal collocation solutions 140 to network 120. Network 120 may receive optimal collocation solutions 140, and may implement optimal collocation solutions 140 (e.g., via the network elements).

Figure 2:
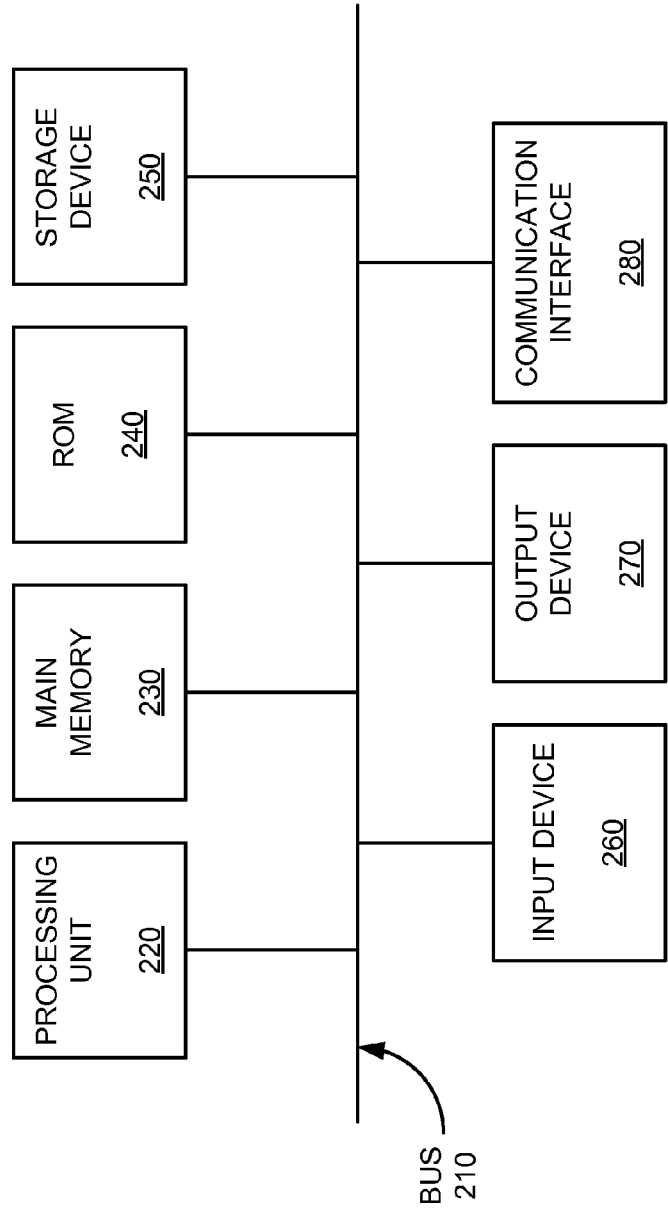
FIG. 2 illustrates exemplary components of a device of the network depicted in FIG. 1.

FIG. 2 is an exemplary diagram of a device 200 that may correspond to device 110. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 120.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
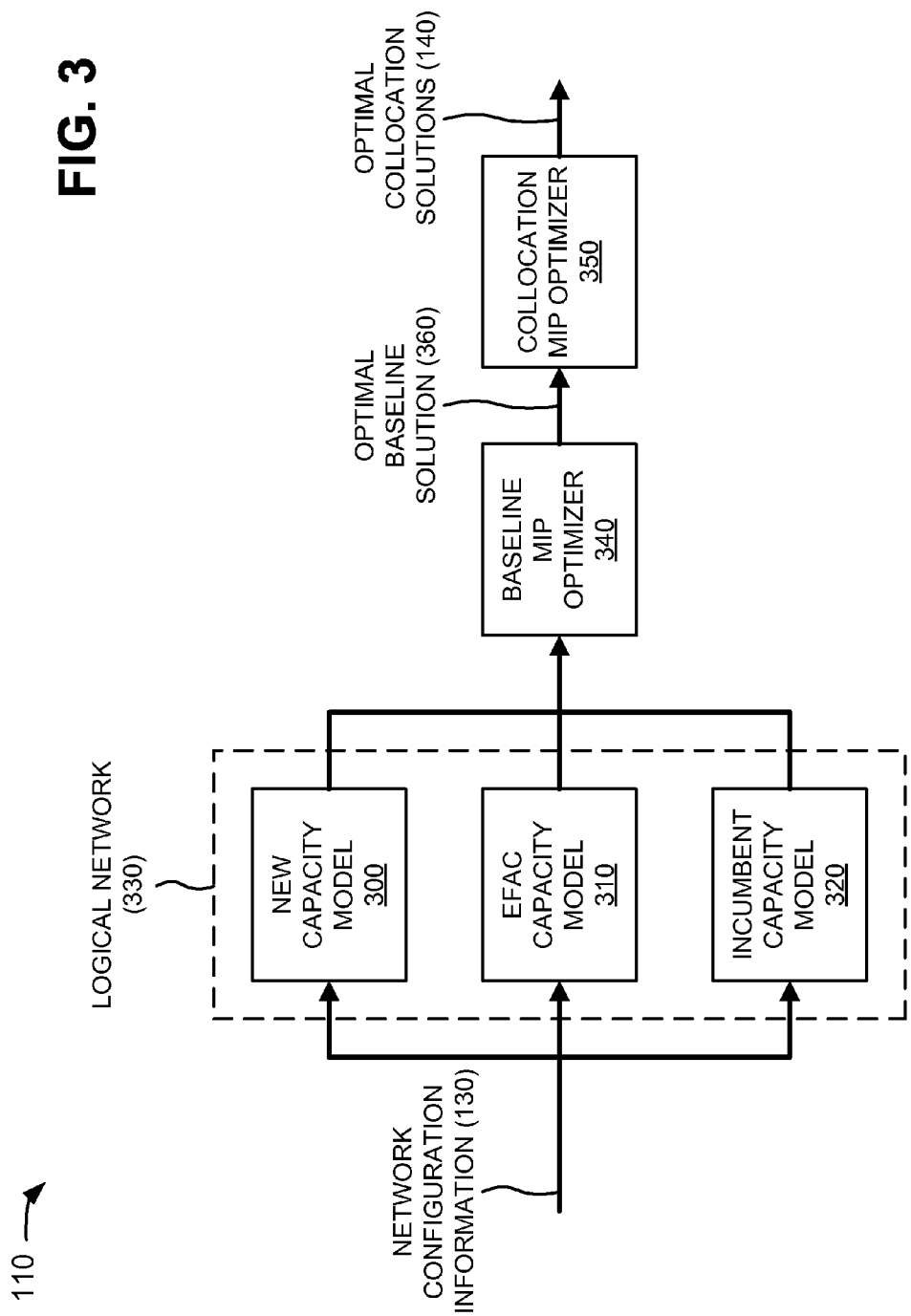
FIG. 3 depicts a diagram of exemplary functional components of the device of the network illustrated in FIG. 1.

FIG. 3 depicts a diagram of exemplary functional components of device 110. As illustrated, device 110 may include a new capacity model 300, an entrance facility (EFAC) capacity model 310, and an incumbent capacity model 320 that together form or represent a logical network 330. Device 110 may further include a baseline mixed integer programming (MIP) optimizer 340 and a collocation MIP optimizer 350. The functions described in FIG. 3 may be performed by one or more of the exemplary components of device 200 depicted in FIG. 2.

New capacity model 300 may include any hardware or combination of hardware and software (e.g., processing unit 220) that enables device 110 to create a partial logical network (e.g., associated with network 120) that may be relevant to new capacity. For example, new capacity model 300 may receive network configuration information 130 from network 120 and user-defined inputs, and may create a partial logical network (e.g., a new capacity model) that may be relevant to new capacity. New capacity model 300 may provide the new capacity partial logical network to baseline MIP optimizer 340. As used herein, the terms "MIP optimizer" and "MIP model" may be used interchangeably. Further details of new capacity model 300 are provided below in connection with, for example, FIGS. 4-6.

Entrance facility capacity model 310 may include any hardware or combination of hardware and software (e.g., processing unit 220) that enables device 110 to create a partial logical network (e.g., associated with network 120) that may be relevant to entrance facility (EFAC) capacity. For example, entrance facility capacity model 310 may receive network configuration information 130 from network 120, and may create a partial logical network (e.g., an entrance facility capacity model) that may be relevant to entrance facility capacity. Entrance facility capacity model 310 may provide the entrance facility capacity partial logical network to baseline MIP optimizer 340. Further details of entrance facility capacity model 310 are provided below in connection with, for example, FIG. 7.

Incumbent capacity model 320 may include any hardware or combination of hardware and software (e.g., processing unit 220) that enables device 110 to create a partial logical network (e.g., associated with network 120) that may be relevant to incumbent capacity (e.g., capacity of network 120 based on an existing network configuration). For example, incumbent capacity model 320 may receive network configuration information 130 from network 120, and may create a partial logical network (e.g., an incumbent capacity model) that may be relevant to incumbent capacity. Incumbent capacity model 320 may provide the incumbent capacity partial logical network to baseline MIP optimizer 340. Further details of incumbent capacity model 320 are provided below in connection with, for example, FIG. 8.

The new capacity model partial logical network, the entrance facility capacity model partial logical network, and the incumbent capacity model partial logical network may together form logical network 330 provided to baseline MIP optimizer 340.

Baseline MIP optimizer 340 may include any hardware or combination of hardware and software (e.g., processing unit 220) that enables device 110 to calculate an optimal baseline solution that minimizes operating costs associated with network 120, based on logical network 330. For example, baseline MIP optimizer 340 may receive logical network 330, and may calculate an optimal baseline solution 360 based thereon. Optimal baseline solution 360 may include a solution that provides an existing baseline configuration for an access network (e.g., network 120) at a least total expense. Baseline MIP optimizer 340 may provide optimal baseline solution 360 to collocation MIP optimizer 350. Further details of baseline MIP optimizer 340 are provided below in connection with, for example, FIG. 9.

Collocation MIP optimizer 350 may include any hardware or combination of hardware and software (e.g., processing unit 220) that enables device 110 to produce optimal collocation solutions 140. For example, collocation MIP optimizer 350 may receive optimal baseline solution 360 from baseline MIP optimizer 340, may perform a collocation optimization procedure against an existing baseline configuration of the access network to produce optimal collocation solutions 140. Device 110 may perform an incremental savings analysis based on optimal baseline solution 360 and optimal collocation solutions 140. Device 110 may store optimal collocation solutions 140, and/or may provide optimal collocation solutions 140 to network 120 for implementation. Further details of collocation MIP optimizer 350 are provided below in connection with, for example, FIG. 10.

In one exemplary implementation, device 110 may implement new capacity model 300, entrance facility capacity model 310, incumbent capacity model 320, baseline MIP optimizer 340, and/or collocation MIP optimizer 350 via object-oriented programming (OOP). Device 110 may implement C programs to extract physical network data (e.g., about network 120) from a database and to store the physical network data in C-style data structures. Device 110 may modify the C programs to populate components that represent logical network 330. Device 110 may further implement C++ programs to convert data stored in C-style data structures to objects of different classes (e.g., site, node, demand, arc, path, etc.). Device 110 may also utilize an ILOG CPLEX optimizer to implement new capacity model 300, entrance facility capacity model 310, incumbent capacity model 320, baseline MIP optimizer 340, and/or collocation MIP optimizer 350.

Device 110 may map a physical access network (e.g., network 120) to logical network 330 in a variety of ways. In one implementation, device 110 may map a physical access network to logical network 330, whose elements may become part of problem data in baseline MIP optimizer 340, in the following manner. Logical network 330 may include nodes (e.g., that model the network elements of network 120) and arcs (e.g., that model the interconnections between the network elements of network 120).

The nodes may represent a site (or facility) of network 120 that may be an entrance facility, a collocation, or a plain wire center (e.g., an end office). An entrance facility and/or a collocation may include a LEC location at which a service provider is either collocated (with its equipment present at that site) or is connected to that site via a transport facility leased from the LEC. Such sites may be represented in a column of a database (e.g., provided in device 110). When constructing logical network 330, device 110 may split each site in the physical network into a set of nodes (e.g., entrance or entrance facility (ent) nodes and end office (eof) nodes). Device 110 may divide each entrance (ent) node into five nodes (e.g., ent, ent_3LC, ent_3LD, ent_LC, and ent_LD). Device 110 may divide each end office (eof) node into four nodes (e.g., eof_3LC, eof_3LD, eof_LC, and eof_LD). The substrings "3LC," "3LD," "LC," and "LD" may indicate a node type. For example, "3LC" may indicate a local (LC) DS3 node type, "3LD" may indicate a long distance (LD) DS3 node type, "LC" may indicate a local (LC) DS1 node type, and "LD" may indicate a long distance (LD) DS1 node type. Device 110 may also create virtual source nodes (e.g., "S1," "S2," "S3," and "SS") to balance logical network 330.

If there are local (or long distance) DS1 circuits terminating at a site (e.g., included within network 120), a local (or long distance) node residing in that site may serve as a single sink node for those circuits (e.g., flows). A count of terminating local (or long distance) circuits at that site may be used to set a demand of its local (or long distance) node. If no DS1 circuit terminates at a site, device 110 may set the demand of the site's local (or long distance) node to zero.

A 3LC node may include a transshipment node. Since local infrastructure (e.g., of network 120) may support both local and long distance traffic, both local and long distance circuits may flow through a 3LC node. Therefore, 3LC nodes may be linked to local (LC) and long distance (LD) sink nodes in pairs. There may be two scenarios where a 3LC node may be used. First, a far end of a new DS3 access line may include a 3LC node. That means any DS1 circuit that may be moved onto new DS3 capacity may pass through a 3LC node. Many new DS3 access lines may be optimally placed between entrance nodes and end office nodes. Second, if there are local entrance facility spares at a site, DS1 circuits using the spares may pass through a 3LC node. In both scenarios, zero-mile local (or long distance) DS1 circuits may terminate immediately at the local (or long distance) node, while other circuits may hop to a different site where they may terminate through a subtending arc.

It may be possible to have new DS3 lines extend to an entrance facility (e.g., from a source node, such as S1), provided that such a DS3 segment cost is available. It may be assumed that the new DS3 capacity at an entrance facility may be used by DS1 circuits terminating at that entrance facility. This may be achieved by disallowing connection between the 3LC node of an entrance facility and sink nodes of other sites. Furthermore, neither subtending from end offices back to entrance facilities nor subtending from entrance facilities may be permitted.

A 3LD node may also include a transshipment node. Unlike 3LC nodes, however, 3LD nodes may be restricted in types of traffic and capacity that they may handle. For example, only long distance (LD) circuits using LD entrance facility spares may pass through 3LD nodes. These LD circuits may include zero-mile circuits and subtend circuits. A local DS1 circuit (or flow) may not enter a 3LD node, and neither may a circuit using new capacity. 3LD nodes may connect to only long distance sink nodes at either the same site or at another site (e.g., through subtending arcs).

One of the differences between an entrance facility and an end office is that an entrance facility may include one more transshipment node than an end office. A new access line (e.g., a DS3 line or a DS1 line (if re-home)) provided between entrance facilities and end offices may include a node (e.g., an ent node) as a front end. Besides the transshipment nodes and sink nodes, virtual source nodes may be included in logical network 330 to maintain an overall flow balance. Source node S1 may include an origin of new capacities, source node S2 may include an origin of entrance facility capacities, source node S3 may include an origin of incumbent capacities, and source node SS may include a super source of all capacities. Source nodes S1, S2, and S3 may be considered transshipment nodes because they may backtrack to source node SS and capacity supplies may be absorbed by source node SS. A supply at source node SS may equal to a total count of incumbent DS1 circuits in an inventory.

Logical network 330 may include two types of arcs, a DS3 arc and a DS1 arc. DS3 arcs may correspond to segments (e.g., provided in the database of device 110), and may be used to trace how many DS3 access lines ought to be on a segment. DS3 arcs may be associated with flow variables and with integer variables that represent a number of DS3 access lines. Optimal flows on arcs may help track optimal routes taken by DS1 circuits. An arc that is not a DS3 arc may be defined as a DS1 arc. Flow variables may be defined on DS1 arcs.

There may be a one-to-one relationship between a DS3 arc and an entrance facility node/end office node segment in the database of device 110. For each entrance facility node/end office node segment in the database, device 110 (e.g., via baseline MIB optimizer 340) may determine a cheapest segment, and/or, if the entrance facility node and the end office node are different, may create an arc between the entrance facility node and a 3LC end office node. Otherwise, both the entrance facility node and the end office node may refer to the same entrance facility, and device 110 may create an arc between a source node (e.g., S1) and a 3LC end office node.

DS1 arcs may be divided into categories, such as least cost routing systems (LCRS—for subtending or re-home) arcs, internal arcs, entrance facility arcs, incumbent arcs, and other arcs. LCRS arcs may correspond to segments in the database of device 110, and may be produced by the following logic. For a given entrance facility node/end office node pair in the database, device 110 (e.g., via baseline MIB optimizer 340) may determine a cheapest segment. If a node is an end office and a number of long distance spares at the end office node are greater than zero, device 110 may create a LCRS arc between a 3LD end office node and a LD entrance facility node. If a node is an entrance facility node, device 110 may create LCRS arcs between an end office node and a LC entrance facility node and between an end office node and a LD entrance facility node. Otherwise, device 110 may create LCRS arcs between a 3LC end office node and a LC entrance facility node and between a 3LC end office node and a LD entrance facility node.

To create entrance facility and incumbent arcs, device 110 may summarize arcs by entrance facilities and demand type (e.g., local or long distance) for the entrance facilities. For each entrance facility, if a number of local spares is greater than zero, device 110 may create an entrance facility arc between a source node (e.g., S2) and an entrance facility node. If a number of LD spares is greater than zero, device 110 may create an entrance facility arc between a source node (e.g., S2) and a 3LD entrance facility node. For each record in the database of device 110, depending on the demand type (e.g., local or long distance), device 110 may add an incumbent arc between a source node (e.g., S3) and a LC entrance facility node or between a source node (e.g., S3) and a LD entrance facility node. To create internal arcs, for each entrance facility node or end office node, device 110 may create internal arcs between 3LC and LC nodes, between 3LC and LD nodes, and/or between 3LD and LD nodes. Other DS1 arcs may include arcs between source nodes (e.g., between SS and S1, between SS and S2, and/or between SS and S3).

Each site of network 120 may include a unique location type (e.g., four location types—location type "0," location type "1," location type "2," and location type "3"). A location type "0" may include a wire center that does not include a LEC path entrance or collocation and can be upgraded to a new collocation. A location type "1" may include an entrance site that includes a LEC path entrance, does not include a collocation, and can be upgraded to a new collocation. A location type "2" may include a collocation that does not have a LEC path entrance. A location type "3" may include an entrance site and collocation that coexist together, and thus, may include a LEC path entrance and a collocation.

In one exemplary implementation described herein, a physical access network (e.g., network 120) may include two entrance facilities (ent1, ent2) and three end offices (eof1, eof2, eof3). Two DS3 segments (e.g., ent1/ent1 and ent1/eof2) may be available from the database of device 110. Three DS1 segments (e.g. ent1/eof1, ent2/eof3, and eof1/eof2) may be available from the database of device 110. Following the rules described above in connection with nodes, arcs, and location types, device 110 may map the physical access network to a logical network (e.g., logical network 330).

Although FIG. 3 shows exemplary functional components of device 110, in other implementations, device 110 may contain fewer, different, differently arranged, or additional functional components than depicted in FIG. 3. In still other implementations, one or more functional components of device 110 may perform one or more other tasks described as being performed by one or more other functional components of device 110.

Figure 4:
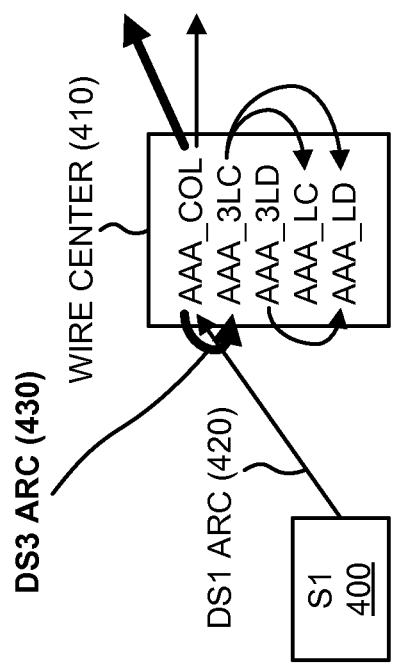
FIG. 4 illustrates a diagram of a partial logical network, relevant to new capacity and a location of type "0," that may be generated by a new capacity model of the device depicted in FIG. 3.

FIG. 4 illustrates a diagram of a partial logical network, relevant to new capacity and a location of type "0," that may be generated by new capacity model 300. As shown, new capacity model 300 may generate a partial logical network that includes a source node (S1) 400 and a wire center 410. As further shown in FIG. 4, new capacity model 300 may generate a partial logical network that includes DS1 arcs 420 (e.g., non-bold arrows) and DS3 arcs 430 (e.g., bold arrows).

Source node (S1) 400 may include virtual source nodes that may be included in logical network 330 to maintain an overall flow balance. Source node (S1) 400 may include an origin of new capacities. Source node (S1) 400 may be considered a transshipment node because it may backtrack to other source nodes and capacity supplies may be absorbed by the other source node(s).

Wire center 410 may include a representation of a wire center provided in a physical access network (e.g., network 120). Wire center 410 may include a potential collocation node (AAA_COL), a 3LC node (AAA_3LC), a 3LD node (AAA_3LD), a LC node (AAA_LC), and a LD node (AAA_LD).

DS1 arcs 420 may include representations of interconnections between network elements of a physical access network (e.g., network 120). DS1 arcs 420 may serve as carriers of digital signal 1 (DS1) network flows. DS1 arcs 420 may include least cost routing systems (LCRS) arcs, internal arcs, entrance facility arcs, incumbent arcs, and/or other arcs.

DS3 arcs 430 may include representations of interconnections between network elements of a physical access network (e.g., network 120). DS3 arcs 430 may serve as carriers of digital signal 3 (DS3) network flows. DS3 arcs 430 may be used to trace how many DS3 access lines ought to be on a segment, and may be associated with flow variables and with integer variables that represent a number of DS3 access lines.

As further shown in FIG. 4, a first DS1 arc 420 may be provided between source node (S1) 400 and the potential collocation node (AAA_COL) of wire center 410, and may correspond to a DS1 segment (e.g., S1/AAA_COL) in the physical access network. A binary variable (z) may be associated with the first DS1 arc 420. If the binary variable (z) is equal to one (1), wire center 410 may be upgraded to a collocation. If the binary variable (z) does not equal to one (1), wire center 410 may remain as a wire center. A first DS3 arc 430 may be provided between the potential collocation node (AAA_COL) of wire center 410 and another node (AAA_3LC) of wire center 410, and may be derived from a DS3 segment (e.g., AAA_COL/AAA_3LC) in the physical access network. Another DS3 arc 430 may be provided between the potential collocation node (AAA_COL) of wire center 410 and a node of another device, and may be derived from a DS3 segment in the physical access network. In one implementation, one or more DS3 access lines may be provided over a single DS3 arc 430. A cost for each DS3 access line may include a transport cost of a corresponding segment plus a demultiplexer charge. Based on DS1 segment information, new capacity model 300 may create three DS1 arcs (e.g., DS1 arcs 420) between a node (AAA_3LD) of wire center 410 and another node (AAA_LD) of wire center 410, between a node (AAA_3LC) of wire center 410 and another node (AAA_LC) of wire center 410, and between a node (AAA_3LC) of wire center 410 and another node (AAA_LD) of wire center 410. A cost for each of DS1 arcs 420 may include a transport cost of the corresponding segment.

DS1 circuits that will use new capacity may be originated from a source node (SS), and may flow through source node (S1) 400. The DS1 circuits may participate in a DS3 access line (e.g., DS3 arc 430) or may be re-homed to an optimal entrance via a DS1 access line (e.g., DS1 arc 420).

Although FIG. 4 shows exemplary components of a partial logical network, in other implementations, the partial logical network may contain fewer, different, differently arranged, or additional components than depicted in FIG. 4. In still other implementations, one or more components of the partial logical network may perform one or more other tasks described as being performed by one or more other components of the partial logical network.

Figure 5:
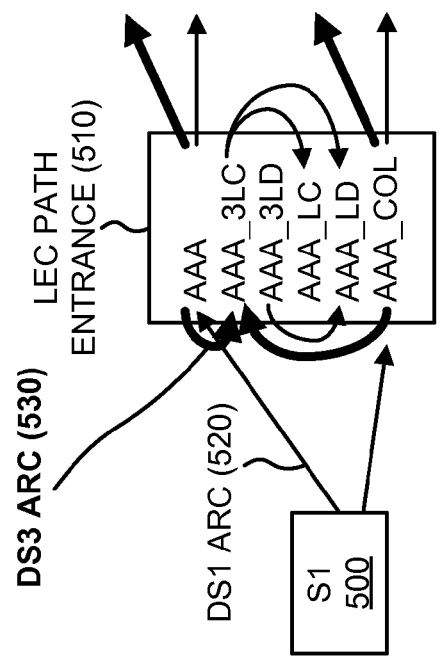
FIG. 5 depicts a diagram of a partial logical network, relevant to new capacity and a location of type "1," that may be generated by the new capacity model of the device illustrated in FIG. 3.

FIG. 5 depicts a diagram of a partial logical network, relevant to new capacity and a location of type "1," that may be generated by new capacity model 300. As shown, new capacity model 300 may generate a partial logical network that includes a source node (S1) 500 and a LEC path entrance 510. As further shown in FIG. 5, new capacity model 300 may generate a partial logical network that includes DS1 arcs 520 (e.g., non-bold arrows) and DS3 arcs 530 (e.g., bold arrows).

Source node (S1) 500 may include virtual source nodes that may be included in logical network 330 to maintain an overall flow balance. Source node (S1) 500 may include an origin of new capacities. Source node (S1) 500 may be considered a transshipment node because it may backtrack to other source nodes and capacity supplies may be absorbed by the other source node(s).

LEC path entrance 510 may include a representation of a LEC path entrance (with no collocation) provided in a physical access network (e.g., network 120). LEC path entrance 510 may include an entrance node (AAA), a 3LC node (AAA_3LC), a 3LD node (AAA_3LD), a LC node (AAA_LC), a LD node (AAA_LD), and a potential collocation node (AAA_COL).

DS1 arcs 520 may include representations of interconnections between network elements of a physical access network (e.g., network 120). DS1 arcs 520 may serve as carriers of digital signal 1 (DS1) network flows. DS1 arcs 520 may include least cost routing systems (LCRS) arcs, internal arcs, entrance facility arcs, incumbent arcs, and/or other arcs.

DS3 arcs 530 may include representations of interconnections between network elements of a physical access network (e.g., network 120). DS3 arcs 530 may serve as carriers of digital signal 3 (DS3) network flows. DS3 arcs 530 may be used to trace how many DS3 access lines ought to be on a segment, and may be associated with flow variables and with integer variables that represent a number of DS3 access lines.

As further shown in FIG. 5, a first DS1 arc 520 may be provided between source node (S1) 500 and a node (AAA) of LEC path entrance 510, and may correspond to a DS1 segment (e.g., S1/AAA) in the physical access network. A second DS1 arc 520 may be provided between source node (S1) 500 and the potential collocation node (AAA_COL) of LEC path entrance 510, and may correspond to a DS1 segment (e.g., S1/AAA_COL) in the physical access network. A binary variable (z) may be associated with the second DS1 arc 520. If the binary variable (z) is equal to one (1), LEC path entrance 510 may be upgraded to a collocation. If the binary variable (z) does not equal to one (1), LEC path entrance 510 may remain as a LEC path entrance.

A first DS3 arc 530 may be provided between a node (AAA) of LEC path entrance 510 and another node (AAA_3LC) of LEC path entrance 510, and may be derived from a DS3 segment (e.g., AAA/AAA_3LC) in the physical access network. Another DS3 arc 530 may be provided between the potential collocation node (AAA_COL) of LEC path entrance 510 and another node (AAA_3LC) of wire center, and may be derived from a DS3 segment (e.g., AAA_COL/AAA_3LC) in the physical access network. DS3 arcs 530 may be provided between nodes (AAA) and (AAA_COL) of LEC path entrance 510 and one or more nodes of one or more other devices, and may be derived from DS3 segments in the physical access network. In one implementation, one or more DS3 access lines may be provided over a single DS3 arc 530. A cost for each DS3 access line may include a transport cost of a corresponding segment plus a demultiplexer charge. Based on DS1 segment information, new capacity model 300 may create three DS1 arcs (e.g., DS1 arcs 520) between a node (AAA_3LD) of LEC path entrance 510 and another node (AAA_LD) of LEC path entrance 510, between a node (AAA_3LC) of LEC path entrance 510 and another node (AAA_LC) of LEC path entrance 510, and between a node (AAA_3LC) of LEC path entrance 510 and another node (AAA_LD) of LEC path entrance 510. A cost for a DS1 arc 520 may include a transport cost of the corresponding segment.

Although FIG. 5 shows exemplary components of a partial logical network, in other implementations, the partial logical network may contain fewer, different, differently arranged, or additional components than depicted in FIG. 5. For example, for location types "2" and "3" LEC path entrance 510 may be similarly arranged except that no AAA_COL node is needed since location types "2" and "3" are already collocation. In still other implementations, one or more components of the partial logical network may perform one or more other tasks described as being performed by one or more other components of the partial logical network.

Figure 6:
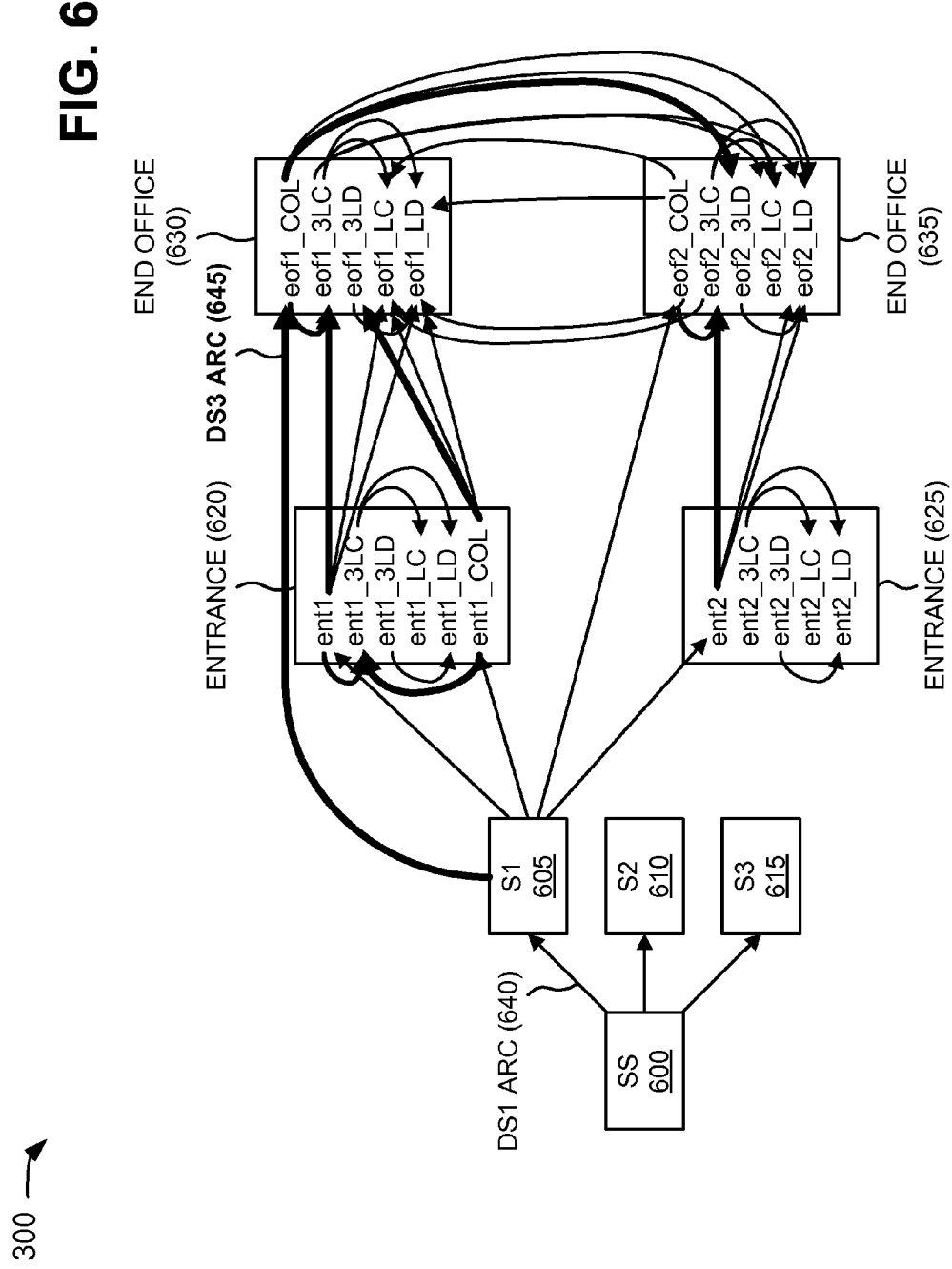
FIG. 6 illustrates a diagram of a partial logical network, relevant to new capacity, that may be generated by the new capacity model of the device depicted in FIG. 3.

FIG. 6 illustrates a diagram of a partial logical network, relevant to new capacity, that may be generated by new capacity model 300. As shown, new capacity model 300 may generate a partial logical network that includes source nodes (SS) 600, (S1) 605, (S2) 610, and (S3) 615, entrance facilities 620 and 625, and end offices (eof1) 630 and (eof2) 635. As further shown in FIG. 4, new capacity model 300 may generate a partial logical network that includes DS1 arcs 640 (e.g., non-bold arrows) and DS3 arcs 645 (e.g., bold arrows).

Source nodes (SS) 600, (S1) 605, (S2) 610, and (S3) 615 may include virtual source nodes that may be included in logical network 330 to maintain an overall flow balance. Source node (SS) 600 may include a super source of all capacities, source node (S1) 605 may include an origin of new capacities, source node (S2) 610 may include an origin of entrance facility capacities, and source node (S3) 615 may include an origin of incumbent capacities. Source nodes (S1) 605, (S2) 610, and (S3) 615 may be considered transshipment nodes because they may backtrack to source node (SS) 600 and capacity supplies may be absorbed by source node (SS) 600. A supply at source node (SS) 600 may equal to a total count of incumbent DS1 circuits in an inventory.

Entrance facilities 620 and 625 may include representations of entrance facilities provided in a physical access network (e.g., network 120). Entrance facility 620 may include an entrance facility node (ent1), a 3LC node (ent1_3LC), a 3LD node (ent1_3LD), a LC node (ent1_LC), a LD node (ent1_LD), and a collocation node (ent1_COL). Entrance facility 625 may include an entrance facility node (ent2), a 3LC node (ent2_3LC), a 3LD node (ent2_3LD), a LC node (ent2_LC), and a LD node (ent2_LD).

End offices 630 and 635 may include representations of end offices provided in a physical access network (e.g., network 120). End office 630 may include a collocation node (eof1_COL), a 3LC node (eof1_3LC), a 3LD node (eof1_3LD), a LC node (eof1_LC), and a LD node (eof1_LD). End office 635 may include a collocation node (eof2_COL), a 3LC node (eof2_3LC), a 3LD node (eof2_3LD), a LC node (eof2_LC), and a LD node (eof2_LD).

DS1 arcs 640 may include representations of interconnections between network elements of a physical access network (e.g., network 120). DS1 arcs 640 may serve as carriers of digital signal 1 (DS) network flows. DS1 arcs 640 may include least cost routing systems (LCRS) arcs, internal arcs, entrance facility arcs, incumbent arcs, and/or other arcs.

DS3 arcs 645 may include representations of interconnections between network elements of a physical access network (e.g., network 120). DS3 arcs 645 may serve as carriers of digital signal 3 (DS3) network flows. DS3 arcs 645 may be used to trace how many DS3 access lines ought to be on a segment, and may be associated with flow variables and with integer variables that represent a number of DS3 access lines. There may be a one-to-one relationship between a DS3 arc and an entrance facility node/end office node segment in the database of device 110.

As further shown in FIG. 6, a first DS3 arc 645 may be provided between source node (S1) and a collocation node (eof1_COL) of end office 630, and may correspond to a DS3 segment in the physical access network. Another DS3 arc 645 may be provided between a collocation node (ent1_COL) of entrance facility 620 and another node (ent1_3LC) of entrance facility 620, and may be derived from a DS3 segment (e.g., ent1_COL/ent1_3LC) in the physical access network. Still another DS3 arc 645 may be provided between a node (ent1) of entrance facility 620 and a node (eof1_3LC) of end office 630, and may be derived from a DS3 segment (e.g., ent1/eof1_3LC) in the physical access network. A further DS3 arc 645 may be provided between a collocation node (ent1_COL) of entrance facility 620 and a node (eof1_3LD) of end office 630, and may be derived from a DS3 segment (e.g., ent1_COL/eof1_3LD) in the physical access network. Still another DS3 arc 645 may be provided between a node (ent2) of entrance facility 625 and a node (eof2_3LC) of end office 635, and may be derived from a DS3 segment (e.g., ent2/eof2_3LC) in the physical access network. A DS3 arc 645 may be provided between a collocation node (eof1_COL) of end office 630 and a node (eof2_3LD) of end office 635, and may be derived from a DS3 segment (e.g., eof1_COL/eof2_3LD) in the physical access network. In one implementation, one or more DS3 access lines may be provided over a single DS3 arc 645. A cost for each DS3 access line may include a transport cost of a corresponding segment plus a demultiplexer charge.

Based on DS3 segment information, new capacity model 300 may create a variety of DS1 arcs (e.g., DS1 arcs 640) between entrance facility 620 and end office 630, between entrance facility 625 and end office 635, and between end offices 635. For example, DS1 arcs may be provided between a node (ent1) of entrance facility 620 and nodes (eof1_LC and eof1_LD) of end office 630, between a collocation node (ent1_COL) of entrance facility 620 and nodes (eof1_LC and eof1_LD) of end office 630, between a node (ent2) of entrance facility 625 and nodes (eof2_LC and eof2_LD) of end office 635, between a collocation node (eof1_COL) of end office 630 and nodes (eof2_LC and eof2_LD) of end office 635, between a node (eof1_3LC) of end office 630 and nodes (eof2_LC and eof2_LD) of end office 635, between a collocation node (eof2_COL) of end office 635 and nodes (eof1_LC and eof1_LD) of end office 630, and between a node (eof2_3LC) of end office 635 and a node (eof1_LC) of end office 630. A cost for a DS1 arc 645 may include a transport cost of the corresponding segment.

DS1 circuits that will use new capacity may be originated from source node (SS) 600, and may flow through source node (S1) 605. The DS1 circuits may participate in a DS3 access line (e.g., DS3 arc 645) or may be re-homed to an optimal entrance via a DS1 access line (e.g., DS1 arc 640).

For example, if it is optimal to send a circuit to node (eof1_LD) of end office 630 along a path (e.g., SS-S1-ent1-eof1_LD), the circuit may re-homed to entrance node (ent1) of entrance facility 620. If the circuit is sent over a path (e.g., SS-S1-ent1-eof1_3LC-eof1_LD), the circuit may traverse a new DS3 access line (e.g., DS3 arc 645) provided between a node (ent1) of entrance facility 620 and a node (eof1_3LC) of end office 630.

In one exemplary implementation, entrance facility 620 may be of location type "1" (i.e., entrance facility 620 may include an existing LEC path entrance that is upgradable to a collocation), and entrance facility 625 may be of location type "2" or "3" (i.e., entrance facility 625 may include a collocation). End offices 630/635 may be wire centers and candidate collocation locations.

Although FIG. 6 shows exemplary components of a partial logical network, in other implementations, the partial logical network may contain fewer, different, differently arranged, or additional components than depicted in FIG. 6. In still other implementations, one or more components of the partial logical network may perform one or more other tasks described as being performed by one or more other components of the partial logical network.

Figure 7:
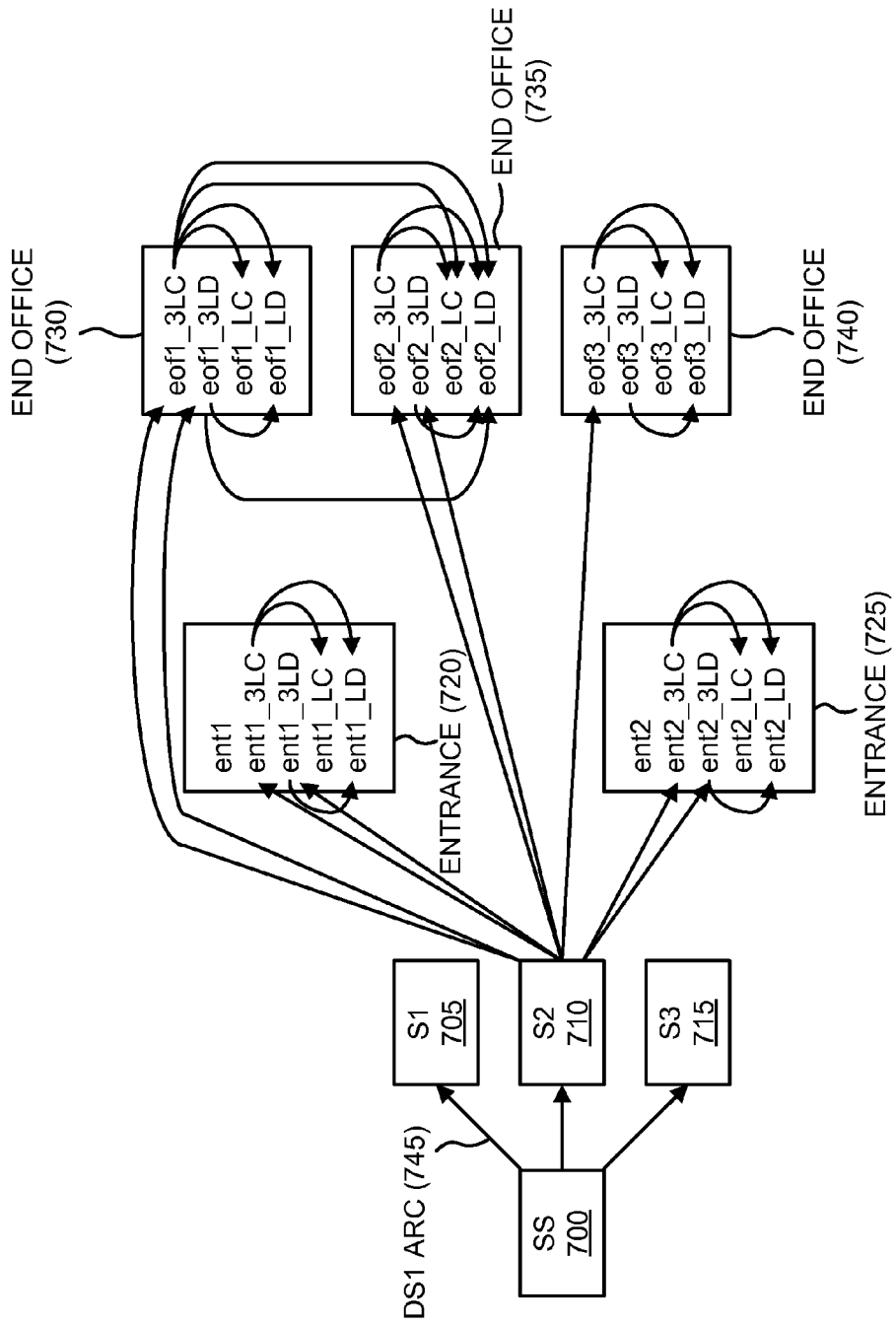
FIG. 7 depicts a diagram of a partial logical network, relevant to entrance facility (EFAC) capacity, that may be generated by an EFAC capacity model of the device illustrated in FIG. 3.

FIG. 7 depicts a diagram of a partial logical network, relevant to entrance facility (EFAC) capacity, that may be generated by EFAC capacity model 310. As illustrated, EFAC capacity model 310 may generate a partial logical network that includes source nodes (SS) 700, (S1) 705, (S2) 710, and (S3) 715, entrance facilities 720 and 725, end offices (eof1) 730, (eof2) 735, and (eof3) 740, and DS1 arcs 745 (e.g., non-bold arrows). Source nodes 700-715, entrance facilities 720/725, end offices 730-740, and DS1 arcs 745 may include the features described above in connection with source nodes 600-615, entrance facilities 620/625, end offices 630/635, and DS1 arcs 640 (FIG. 6).

As further shown in FIG. 7, source node (S2) 710 may connect to a 3LC (or 3LD) node of entrance facilities 720 and 725 if there are local (or long distance) spares available at entrance facilities 720 and 725. Internal transition arcs (e.g., provided between a node (ent1_3LC) and a node (ent1_LC), and between a node (ent1_3LD) and a node (ent1_LD)) may feed circuits on an entrance facility (e.g., entrance facility 720) to the sink (e.g., to a node (ent1_LC) or to a node (ent1_LD)). In this exemplary implementation, entrance facilities 720/725 and end offices 730-740 may include local and long distance spares except that end office 740 may not include a long distance spare. An upper bound (or maximum flow) of an entrance facility arc may equal a number of spares available at a destination node. Since entrance facility spares are free to use, costs associated with sending flows on entrance facility arcs are zero.

As shown in FIG. 7, three subtending arcs from end office 730 to end office 735 (e.g., between nodes eof1_3LC and eof2_LC, nodes eof1_3LC and eof2_LD, and nodes eof1_3LD and eof2_LD) may make spares at end office 730 available to circuits terminating at end office 735. Although DS1 segments between entrance facility 720 and end office 730 and between entrance facility 725 and end office 740 exist, subtending from entrance facilities 720/725 may not be allowed. In one implementation, EFAC capacity model 310 may send circuits over usable EFAC capacity before other alternatives (e.g., other network elements of network 120).

Although FIG. 7 shows exemplary components of a partial logical network, in other implementations, the partial logical network may contain fewer, different, differently arranged, or additional components than depicted in FIG. 7. In still other implementations, one or more components of the partial logical network may perform one or more other tasks described as being performed by one or more other components of the partial logical network.

Figure 8:
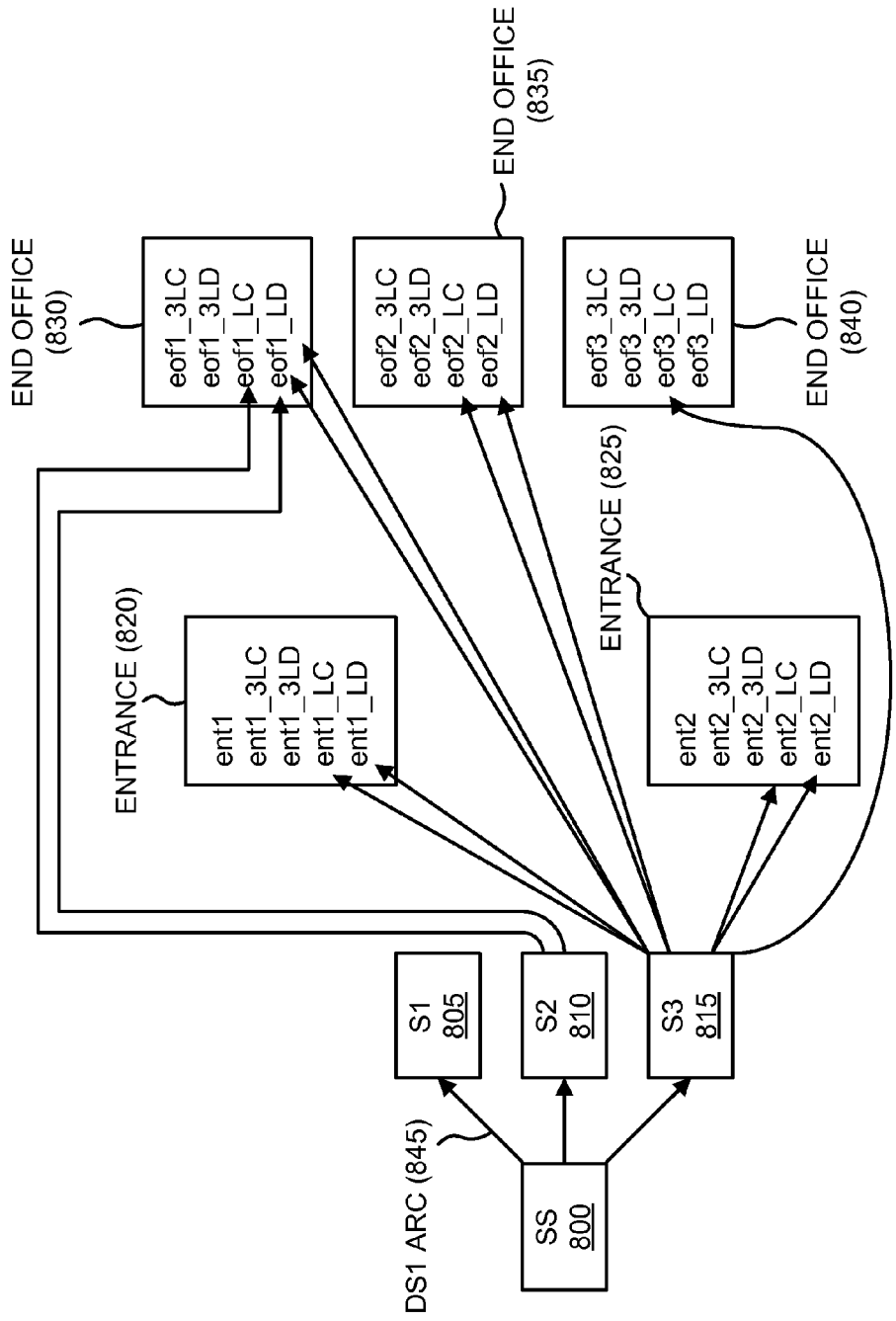
FIG. 8 illustrates a diagram of a partial logical network, relevant to incumbent capacity, that may be generated by an incumbent capacity model of the device depicted in FIG. 3.

FIG. 8 illustrates a diagram of a partial logical network, relevant to incumbent capacity, that may be generated by incumbent capacity model 320. As illustrated, incumbent capacity model 320 may generate a partial logical network that includes source nodes (SS) 800, (S1) 805, (S2) 810, and (S3) 815, entrance facilities 820 and 825, end offices (eof1) 830, (eof2) 835, and (eof3) 840, and DS1 arcs 845 (e.g., non-bold arrows). Source nodes 800-815, entrance facilities 820/825, end offices 830-840, and DS1 arcs 845 may include the features described above in connection with source nodes 600-615, entrance facilities 620/625, end offices 630/635, and DS1 arcs 640 (FIG. 6).

The partial logical network generated by incumbent capacity model 320 may reflect incumbent routes of circuits and their associated costs. For each circuit, incumbent capacity model 320 may create an arc between source node (S3) 815 and a sink node that may be dedicated to the circuit. An upper bound on an incumbent arc may be equal to one. A cost of saturating an incumbent arc may include a corresponding incumbent cost. In one example, if it is assumed that there are nine circuits in an inventory, incumbent capacity model 320 may create nine incumbent arcs in the partial logical network between source node (S3) 815 and nodes of entrance facilities 820/825 and end offices 830-840. Two parallel incumbent arcs may be provided between source node (S3) 815 and a node (eof1_LD) of end office 830, which may indicate that end office 830 includes two LD circuits. Although it may seem that these two incumbent arcs are identical, they may not be interchangeable since they may be dedicated to different circuits and may have different incumbent costs. When an incumbent arc is created, incumbent capacity model 320 may tag the incumbent arc with a demand identifier of its corresponding circuit. If an incumbent arc is saturated (e.g. overused) in optimal baseline solution 360, incumbent capacity model 320 may maintain a matching circuit with its incumbent route.

Although FIG. 8 shows exemplary components of a partial logical network, in other implementations, the partial logical network may contain fewer, different, differently arranged, or additional components than depicted in FIG. 8. In still other implementations, one or more components of the partial logical network may perform one or more other tasks described as being performed by one or more other components of the partial logical network.

Figure 9:
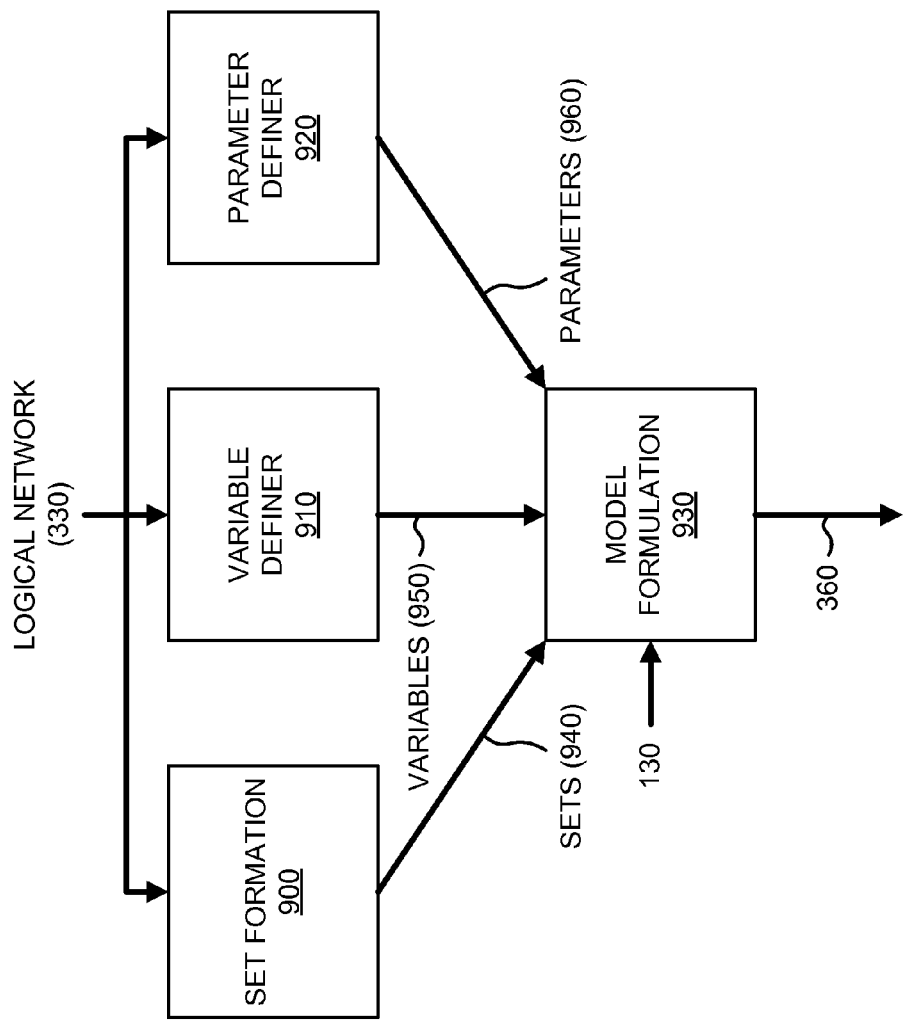
FIG. 9 depicts a diagram of exemplary functional components of a mixed integer programming (MIP) model of the device illustrated in FIG. 3.

FIG. 9 depicts a diagram of exemplary functional components of baseline mixed integer programming (MIP) optimizer 340. As illustrated baseline MIP optimizer 340 may include set formation logic 900, variable definer logic 910, parameter definer logic 920, and model formulation logic 930. In one implementation, baseline MIP optimizer 340 may identify optimal new collocation locations and may perform access network planning. Baseline MIP optimizer 340 may attempt to minimize a total of transport costs and collocation installation costs. Integer variables and constraints may be added to baseline MIP optimizer 340 to recognize additional cost saving opportunities afforded by establishment of new collocations. The functions described in FIG. 9 may be performed by one or more of the exemplary components of device 200 depicted in FIG. 2.

Set formation logic 900 may include any hardware or combination of hardware and software (e.g., processing unit 220) that enables baseline MIP optimizer 340 to receive logical network 330, and to create sets 940 based on logical network 330. Each of sets 940 may include a group of network elements (e.g., as represented by logical network 330) possessing identical and/or similar attributes. Sets 940 enable baseline MIP optimizer 340 to express formulations in a condensed and efficient manner. In one exemplary implementation, sets 940 may include a set of nodes (N), a set of DS1 arcs ($E_{DS1}$), a set of DS3 arcs ($E_{DS3}$), a set of all arcs (E= $E_{DS1} \cup E_{DS3}$), a set of arcs arriving at a node ($I_i$, where i ∈ N, and $I_i = \{(j, i): \forall j \in N\setminus\{i\}$, and $(j, i)$ is a valid arc$\}$, a set of arcs departing from a node ($O_i$, where $O_i = \{(i, j): \forall j \in N\setminus\{i\}$, and $(i, j)$ is a valid arc$\}$, and a set of DS1 arcs ($E_{COL}$) between a source node (e.g., "S1") and a collocation node (e.g., "_COL").

Variable definer logic 910 may include any hardware or combination of hardware and software (e.g., processing unit 220) that enables baseline MIP optimizer 340 to receive logical network 330, and to define variables 950 based on logical network 330. In one implementation, variables 950 may include sets of decision variables defined to capture a decision. For example, variables 950 may include continuous variables ($x_e$) indicating units of flow carried over an arc (e, where e ∈ E), integer variables ($y_a$) representing a number of new DS3 circuits over a DS3 arc (a ∈ $E_{DS3}$), and binary variables ($z_k$) defined over an arc (k ∈ $E_{COL}$, where if $z_k=1$, a new collocation may be installed at the site where k ends; the site may not be eligible as a collocation location).

Parameter definer logic 920 may include any hardware or combination of hardware and software (e.g., processing unit 220) that enables baseline MIP optimizer 340 to receive logical network 330, and to define parameters 960 based on logical network 330. In one exemplary implementation, parameters 960 may include a demand ($b_i$) for a node (i ∈ N), a lower bound ($l_e$) for units of flow that may be shipped on an arc (e ∈ E), an upper bound ($u_e$) for units of flow that may be shipped on an arc (e ∈ E), a cost ($c_e$) incurred for sending one unit of flow (e.g., a circuit) over a DS1 arc (e ∈ $E_{DS1}$), a cost ($C_a$) of constructing a new DS3 access line over an arc (a ∈ $E_{DS3}$), and a cost ($F_k$) of installing a new collocation at a site where an arc (k ∈ $E_{COL}$) ends.

For a super source node (SS), demand ($b_i$) may equal a total number of DS1 circuits. For a site terminating with local (or long distance) circuits, a demand ($b_i$) associated with its local (or long distance) nodes may include a negative of a number of terminating local (or long distance) circuits. Demand ($b_i$) may be zero for other types of nodes.

Lower bound ($l_e$) may be set to zero for all arcs. For incumbent arcs, upper bound ($u_e$) may equal one. For entrance facility arcs, upper bound ($u_e$) may equal a total of local or long distance spares provided at an entrance facility. Upper bound ($u_e$) may be infinite for other types of arcs.

For a LCRS arc, cost ($c_e$) may be equal to a corresponding DS1 segment cost. For an incumbent arc, cost ($c_e$) may be equal to an incumbent transport cost of a corresponding circuit. Cost ($c_e$) may be zero for other types of arcs. Cost ($C_a$) may be equal to a corresponding DS3 segment cost.

Model formulation logic 930 may include any hardware or combination of hardware and software (e.g., processing unit 220) that receives sets 940, variables 950, and parameters 960 from set formation logic 900, variable definer logic 910, and parameter definer logic 920, respectively, and receives network configuration information 130 (e.g., current network configuration and user-defined inputs) from network 120. Model formulation logic 930 may formulate optimal baseline solution 360 based on sets 940, variables 950, parameters 960, and network configuration information 130. In one exemplary implementation, model formulation logic 930 may formulate optimal baseline solution 360 (e.g., which may minimize total access network transport cost) according to the following equation:

$$\min \sum_{e \in E_{DS1}} c_e x_e + \sum_{a \in E_{DS3}} C_a y_a + \sum_{k \in E_{COL}} F_k z_k.$$

Model formulation logic 930 may implement constraints on optimal baseline solution 360. For example, model formulation logic 930 may implement flow-conservation constraints (e.g., according to the equation $$\left( \sum_{e \in I_i} x_e - \sum_{e \in O_i} x_e = b_i, \forall\ i \in N \right)$$

to ensure that total outgoing flows minus total incoming flows at a given node may equal to its demand. Model formulation logic 930 may implement a set of constraints that enforces multiplexer modulation restrictions (e.g., that no more than twenty-eight DS1 circuits may ride on a single DS3 access line). If a number of DS3 access lines (y) over a segment is greater than one, a flow (x) over these access lines may not exceed a product of "28" and y. If flow (x) is positive, model formulation logic 730 may seek a smallest value for y under the influence of an objective function (e.g., $x_a \leq 28 y_a$, $\forall\ a \in E_{DS3}$). Model formulation logic 930 may implement a set of constraints that associate a decision to install a new collocation with units of flow traversing a corresponding collocation node. If M denotes a sufficiently large number and $z_k$ is "1," there may be no restriction on units of network flow ($x_k$) traversing a new collocation (e.g., $x_k \leq M z_k$, $\forall\ k \in E_{COL}$). Otherwise (e.g., $z_k$ is not "1"), installing a new collocation may not be considered. Model formulation logic 930 may implement other constraints (e.g., $l_e \leq x_e \leq u_e$, $\forall\ e \in E$, $y_a \geq 0$, $\forall\ a \in E_{DS3}$, and $z_k$, $\forall\ k \in E_{COL}$) that may define decision variables.

Although FIG. 9 shows exemplary functional components of baseline MIP optimizer 340, in other implementations, baseline MIP optimizer 340 may contain fewer, different, differently arranged, or additional functional components than depicted in FIG. 9. In still other implementations, one or more functional components of baseline MIP optimizer 340 may perform one or more other tasks described as being performed by one or more other functional components of baseline MIP optimizer 340.

Optimal baseline solution 360 (e.g., provided by baseline MIP optimizer 340) may represent a cost-effective way to route circuit demands. If a certain incumbent route is suboptimal, baseline MIP optimizer 340 may locate an optimal move using an entrance facility capacity or new capacity. In addition, baseline MIP optimizer 340 may plan new DS3 access lines if grouping sufficient DS1 circuits on such DS3 access lines could provide cost savings. However, optimal baseline solution 360 may not propose new collocations for access networks and may not identify optimal collocation locations for access networks. Collocation MIP optimizer 350 may be used to create a baseline of savings for an access network (e.g., using existing collocations), which may be used to calculate incremental savings if new collocations are commissioned. Collocation MIP optimizer 350 may also identify optimal candidates for collocations in an access network (e.g., network 120), and may provide an optimal rearrangement of access circuits (e.g., taking into consideration the proposed new collocations).

Figure 10:
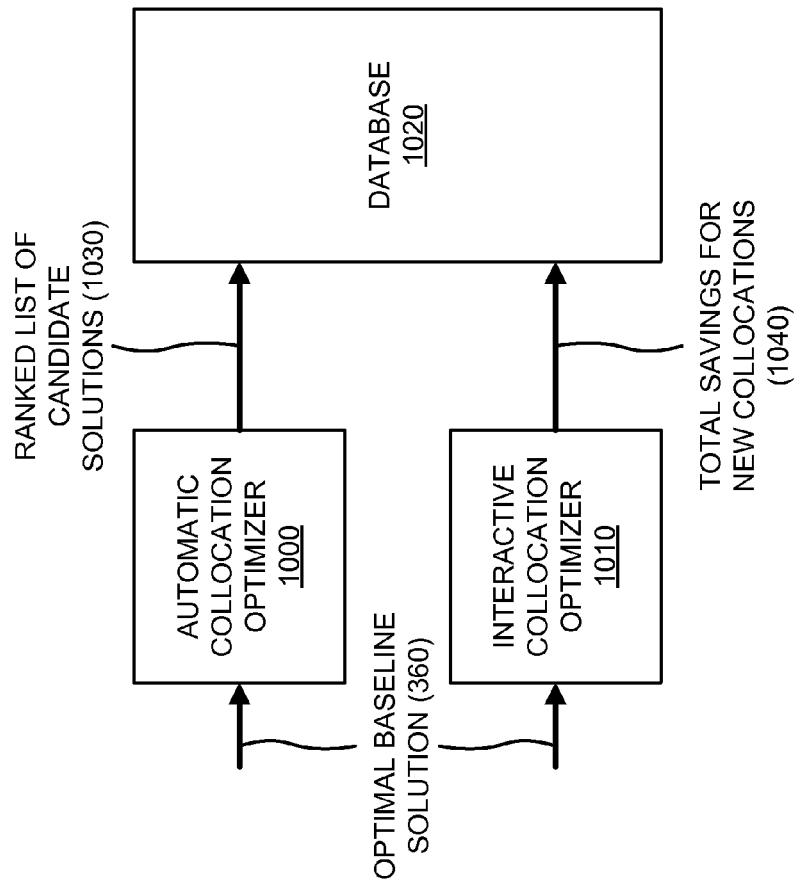
FIG. 10 illustrates a diagram of exemplary functional components of a collocation optimizer of the device depicted in FIG. 3.

FIG. 10 illustrates a diagram of exemplary functional components of collocation MIP optimizer 350. As shown, collocation MIP optimizer 350 may include an automatic collocation optimizer 1000, an interactive collocation optimizer 1010, and a database 1020. The functions described in FIG. 10 may be performed by one or more of the exemplary components of device 200 depicted in FIG. 2.

Automatic collocation optimizer 1000 may include any hardware or combination of hardware and software (e.g., processing unit 220) that receives optimal baseline solution 360 from baseline MIP optimizer 340, and automatically determines a ranked list of candidate solutions 1030 (e.g. a best set of new collocations) based on optimal baseline solution 360. For example, automatic collocation optimizer 1000 may determine (e.g., based on optimal baseline solution 360) a ranked list of new collocations for an access network (e.g., network 120). Automatic collocation optimizer 1000 may provide ranked list of candidate solutions 1030 to database 1020.

Interactive collocation optimizer 1010 may include any hardware or combination of hardware and software (e.g., processing unit 220) that receives optimal baseline solution 360 from baseline MIP optimizer 340, and receives (e.g., from network engineers) one or more designated sites as new collocations. Interactive collocation optimizer 1010 may analyze optimal baseline solution 360 and the suggested new collocations, and may generate a total savings 1040 for the new collocations based on the analysis. For example, the network engineers may identify new collocations, and interactive collocation optimizer 1010 may evaluate the proposed new collocations. Interactive collocation optimizer 1010 may provide total savings 1040 for the new collocations to database 1020.

Database 1020 may include a memory device (e.g., main memory 230, ROM 240, storage device 250, etc.) that may receive ranked list of candidate solutions 1030 from automatic collocation optimizer 1000 and total savings 1040 for new collocations from interactive collocation optimizer 1010, and may store the information. Ranked list of candidate solutions 1030 and total savings 1040 for new collocations may be included in optimal collocation solutions 140. In one exemplary implementation, database 1020 may also store network configuration information 130 and/or optimal collocation solutions 140.

Although FIG. 10 shows exemplary functional components of collocation MIP optimizer 350, in other implementations, collocation MIP optimizer 350 may contain fewer, different, differently arranged, or additional functional components than depicted in FIG. 10. In still other implementations, one or more functional components of collocation MIP optimizer 350 may perform one or more other tasks described as being performed by one or more other functional components of collocation MIP optimizer 350.

Figure 11:
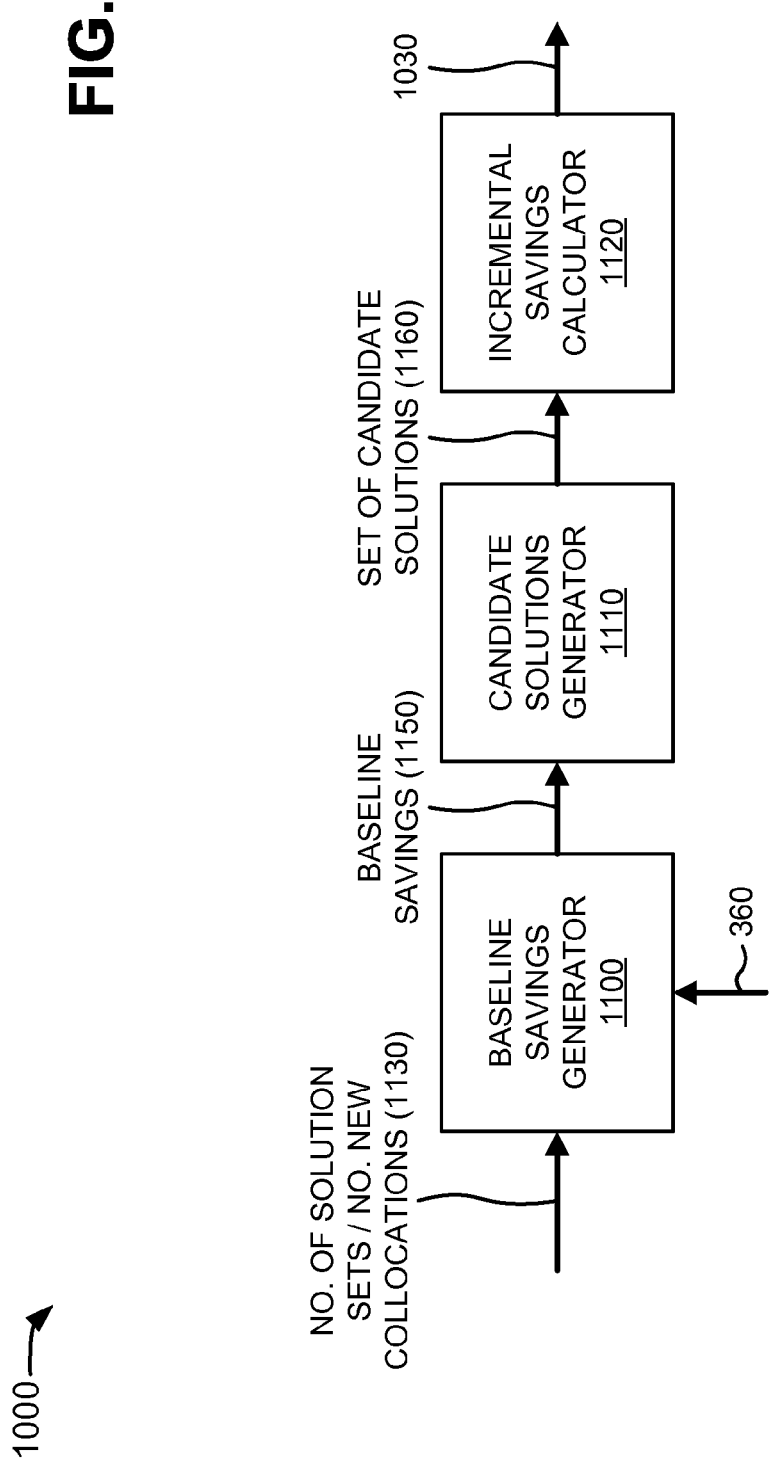
FIG. 11 depicts a diagram of exemplary functional components of an automatic collocation optimizer of the collocation optimizer illustrated in FIG. 10.

FIG. 11 depicts a diagram of exemplary functional components of automatic collocation optimizer 1000 of collocation MIP optimizer 350. As shown, automatic collocation optimizer 1000 may include a baseline savings generator 1100, a candidate solutions generator 1110, and an incremental savings calculator 1120. The functions described in FIG. 11 may be performed by one or more of the exemplary components of device 200 depicted in FIG. 2.

Baseline savings generator 1100 may include any hardware or combination of hardware and software (e.g., processing unit 220) that receives optimal baseline solution 360, and receives a number of solution sets and a number of new collocations per solution, as indicated by reference number 1130 (e.g., from a network engineer). Number of solution sets/new collocations 1130 may include information identifying one or more sites in an access network (e.g., network 120) where a new collocation may be provided. Baseline savings generator 1100 may fix current collocations in an access network, and may generate baseline savings 1150 (e.g., DS1 and DS3 savings), based on optimal baseline solution 360. Baseline savings generator 1100 may provide baseline savings 1150 to candidate solutions generator 1110.

Candidate solutions generator 1110 may include any hardware or combination of hardware and software (e.g., processing unit 220) that receives baseline savings 1150 from baseline savings generator 1100, and generates a set of candidate solutions 1160 (e.g., each including the number of new collocations) by optimizing the access network in its current state. Candidate solutions generator 1110 may provide set of candidate solutions 1160 to incremental savings calculator 1120.

Incremental savings calculator 1120 may include any hardware or combination of hardware and software (e.g., processing unit 220) that receives set of candidate solutions 1160 from candidate solutions generator 1110, and, for each candidate solution, calculates incremental DS1 savings, incremental DS3 savings, and estimated operating company number (OCn) savings. Incremental savings calculator 1120 may determine a total savings based on the calculated savings, and may create ranked list of candidate solutions 1030 (e.g., that may be ranked based on the determined total savings).

Although FIG. 11 shows exemplary functional components of automatic collocation optimizer 1000, in other implementations, automatic collocation optimizer 1000 may contain fewer, different, differently arranged, or additional functional components than depicted in FIG. 11. In still other implementations, one or more functional components of automatic collocation optimizer 1000 may perform one or more other tasks described as being performed by one or more other functional components of automatic collocation optimizer 1000.

Figure 12:
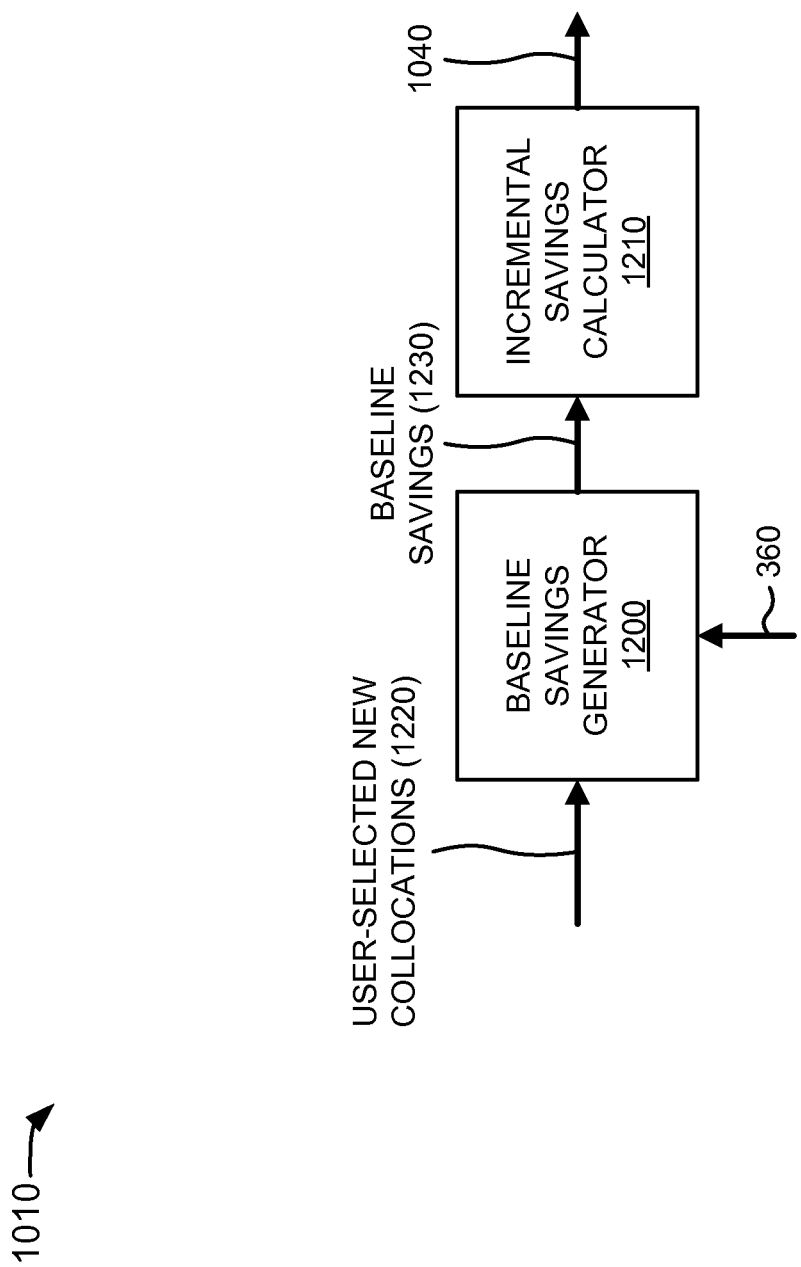
FIG. 12 illustrates a diagram of exemplary functional components of an interactive collocation optimizer of the collocation optimizer depicted in FIG. 10.

FIG. 12 illustrates a diagram of exemplary functional components of interactive collocation optimizer 1010 of collocation MIP optimizer 350. As shown, interactive collocation optimizer 1010 may include a baseline savings generator 1200 and an incremental savings calculator 1210. The functions described in FIG. 12 may be performed by one or more of the exemplary components of device 200 depicted in FIG. 2.

Baseline savings generator 1200 may include any hardware or combination of hardware and software (e.g., processing unit 220) that receives user-selected new collocations 1220 (e.g., from a network engineer) and receives optimal baseline solution 360. User-selected new collocations 1220 may include information identifying one or more sites in an access network (e.g., network 120) where a new collocation may be provided. User-selected new collocations 1220 may not be the most optimal, but may be a guess of the optimal set provided by the network engineer. Baseline savings generator 1200 may fix current collocations and user-selected new collocations 1220, and may generate baseline savings 1230 (e.g., DS1 and DS3 savings), based on the fixed collocations, by optimizing the access network in its current state (e.g., without considering user-selected new collocations 1220). Baseline savings generator 1200 may provide baseline savings 1230 to incremental savings calculator 1210.

Incremental savings calculator 1210 may include any hardware or combination of hardware and software (e.g. processing unit 220) that receives baseline savings 1230 from baseline savings generator 1200, and calculates incremental DS1 savings, incremental DS3 savings, and estimated OCn savings. Incremental savings calculator 1210 may determine total savings 1040 for the new collocations based on the calculated savings. In one example, incremental savings calculator 1210 may optimize the access network (e.g., with user-selected new collocations 1220) to generate savings for the new optimal rearrangement of the access network. If the new optimal rearrangement of the access network yields a better result than baseline savings 1230, then incremental savings calculator 1210 may determine that user-selected new collocations 1220 provide incremental benefits and may output total savings 1040 for new collocations. If the new optimal rearrangement of the access network yields a worse result than baseline savings 1230, then incremental savings calculator 1210 may determine that user-selected new collocations 1220 are not to be used and may return a solution that optimizes the access network in its current state.

Although FIG. 12 shows exemplary functional components of interactive collocation optimizer 1010, in other implementations, interactive collocation optimizer 1010 may contain fewer, different, differently arranged, or additional functional components than depicted in FIG. 12. In still other implementations, one or more functional components of interactive collocation optimizer 1010 may perform one or more other tasks described as being performed by one or more other functional components of interactive collocation optimizer 1010.

Figure 13:
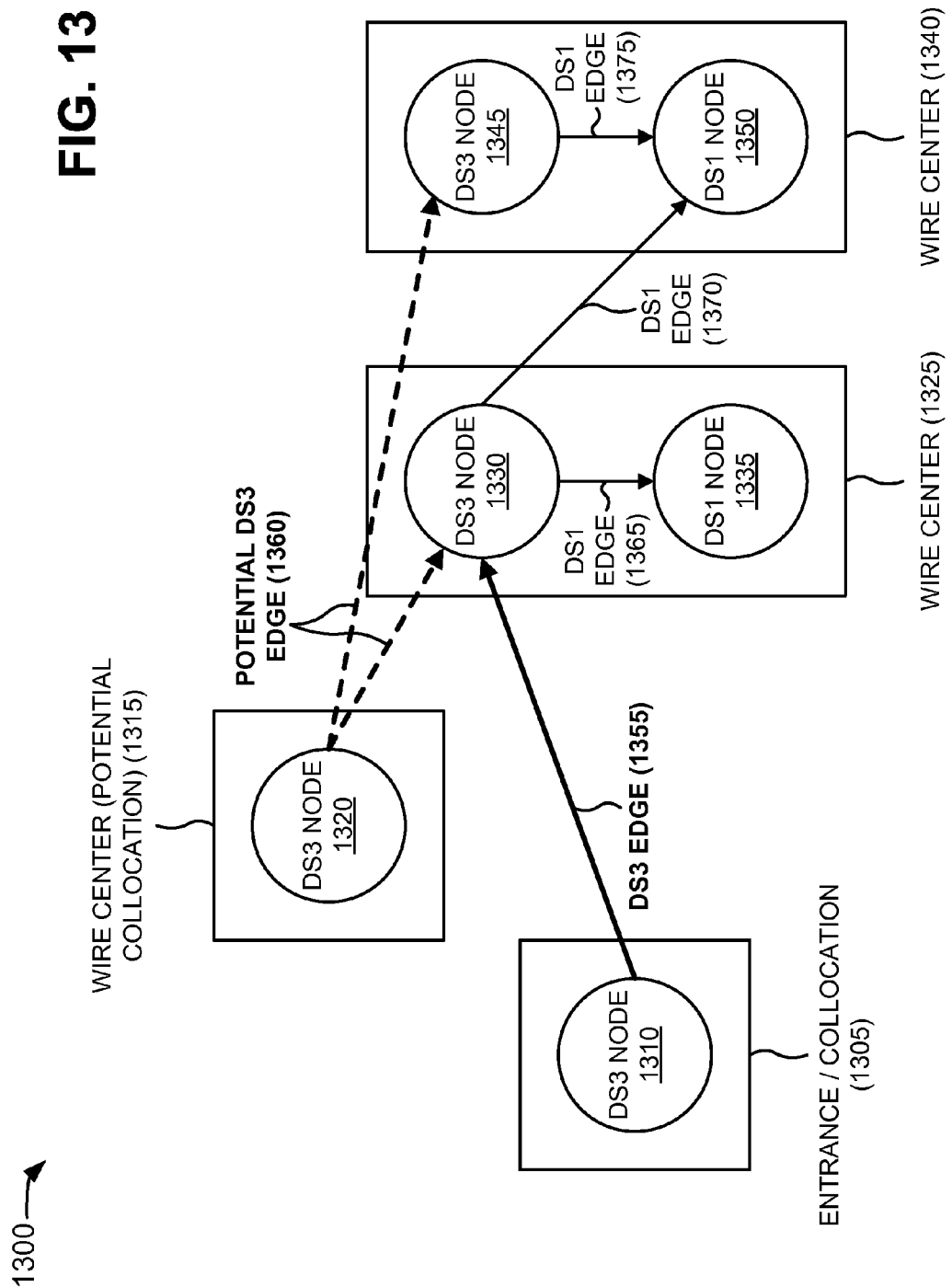
FIG. 13 depicts a diagram of a partial logical network that may be generated by the MIP model of the device illustrated in FIG. 3.

FIG. 13 depicts a diagram of a partial logical network 1300 that may be generated by baseline MIP optimizer 340. As illustrated, partial logical network 1300 may include an entrance facility/collocation 1305 (e.g., that includes a DS3 node 1310), a wire center 1315 (e.g., that is a potential collocation and includes a DS3 node 1320), a wire center 1325 (e.g., that includes a DS3 node 1330 and a DS1 node 1335), and a wire center 1340 (e.g., that includes a DS3 node 1345 and a DS1 node 1350).

Entrance facility/collocation 1305 may provide a representation of an entrance facility (e.g., that is also a collocation) in an access network (e.g., network 120). Wire center 1315 may provide a representation of a wire center (e.g., that is a potential collocation) in the access network. Wire centers 1325/1340 may provide representations of wire centers in the access network. DS3 nodes 1310, 1320, 1330, and 1345 may provide representations of DS3 access circuits in the access network. DS1 nodes 1335/1350 may provide representations of DS1 access circuits in the access network.

As further shown in FIG. 13, baseline MIP optimizer 340 may provide a DS3 edge (or arc) 1355 between DS3 node 1310 and DS3 node 1330. DS3 edge 1355 may be associated with capacity and cost parameters, and may include a representation of an interconnection between network elements of a physical access network (e.g., network 120). DS3 edge 1355 may serve as a carrier of digital signal 3 (DS3) network flows. Baseline MIP optimizer 340 may provide potential DS3 edges 1360 between DS3 node 1320 and DS3 nodes 1330/1345. Potential DS3 edges 1360 may be associated with capacity and cost parameters, and may include representations of potential interconnections between network elements of a physical access network (e.g., network 120). Potential DS3 edges 1360 may serve as potential carriers of digital signal 3 (DS3) network flows. Each of DS3 edges 1355/1360 may include an available capacity of "28" DS1 units.

A DS1 edge 1365 may be provided between DS3 node 1330 and DS1 node 1335, another DS1 edge 1370 may be provided between DS3 node 1330 and DS1 node 1350, and still another DS1 edge 1375 may be provided between DS3 node 1345 and DS1 node 1350. DS1 edges 1365-1375 may be associated with capacity and cost parameters, and may include representations of an interconnection between network elements of a physical access network (e.g., network 120). DS1 edges 1365-1375 may serve as carriers of digital signal 1 (DS1) network flows. DS1 edges 1365-1375 may be divided into categories, such as least EFAC edges, inter-site subtending edges, intra-site transition edges, incumbent edges, and other edges.

Baseline MIP optimizer 340 may optimize an existing solution by simultaneously using existing capacity of an access network, proposing new hubs and/or DS3 facilities for the access network, moving DS1*s* to more optimal entrances, and creating subtending DS1 opportunities from existing or new DS3 facilities.

Although FIG. 13 shows exemplary components of partial logical network 1300, in other implementations, partial logical network 1300 may contain fewer, different, differently arranged, or additional components than depicted in FIG. 13. In still other implementations, one or more components of partial logical network 1300 may perform one or more other tasks described as being performed by one or more other components of partial logical network 1300.

Figure 14:
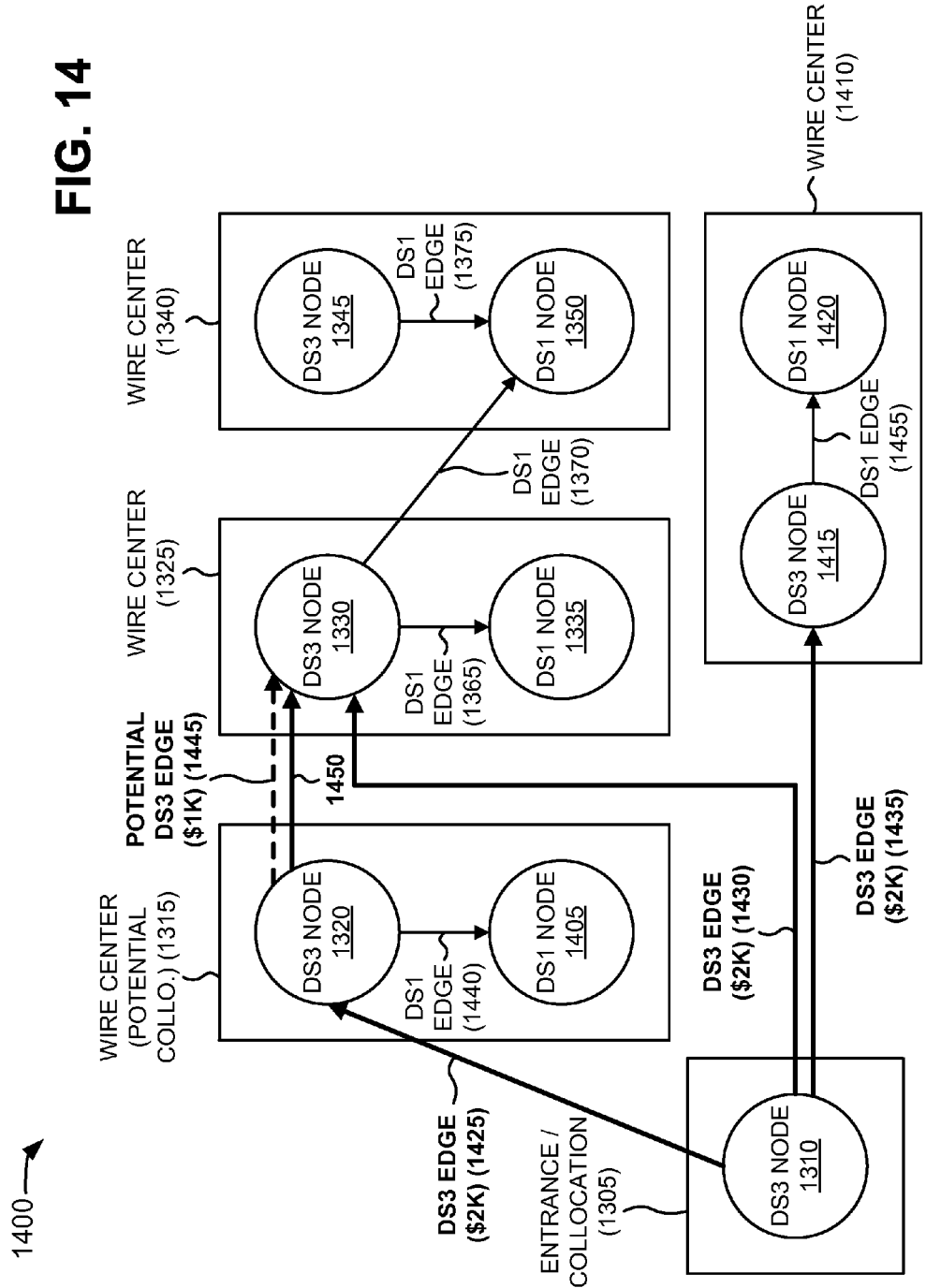
FIG. 14 illustrates a diagram of another partial logical network that may be generated by the MIP model of the device depicted in FIG. 3.

FIG. 14 illustrates a diagram of another partial logical network 1400 (e.g., when a wire center is upgraded to a collocation) that may be generated by baseline MIP optimizer 340. As shown, partial logical network 1400 may include entrance facility/collocation 1305 (e.g., that includes DS3 node 1310), wire center 1315 (e.g., that is a potential collocation and includes DS3 node 1320), wire center 1325 (e.g., that includes DS3 node 1330 and DS1 node 1335), wire center 1340 (e.g., that includes DS3 node 1345 and DS1 node 1350), and DS1 edges 1365-1375. Entrance facility/collocation 1305, DS3 node 1310, wire center 1315, DS3 node 1320, wire center 1325, DS3 node 1330, DS1 node 1335, wire center 1340, DS3 node 1345, DS1 node 1350, and DS1 edges 1365-1375 may include the features described above in connection with FIG. 13. As further shown in FIG. 14, partial logical network 1400 may include a DS1 node 1405 provided in wire center 1315, and a wire center 1410 (e.g., that includes a DS3 node 1415 and a DS1 node 1420).

DS1 nodes 1405/1420 may provide representations of DS1 access circuits in the access network. Wire center 1410 may provide representations of a wire center in the access network. DS3 node 1415 may provide a representation of a DS3 access circuit in the access network. As further shown in FIG. 14, baseline MIP optimizer 340 may provide a DS3 edge 1425 between DS3 node 1310 and DS3 node 1320, a DS3 edge 1430 between DS3 node 1310 and DS3 node 1330, and a DS3 edge 1435 between DS3 node 1310 and DS3 node 1415. DS3 edges 1425-1435 may be associated with capacity and cost parameters (e.g., $2000), and may include representations of interconnections between network elements of a physical access network (e.g., network 120). DS3 edges 1425-1435 may serve as carriers of digital signal 3 (DS3) network flows.

Baseline MIP optimizer 340 may provide a DS1 edge 1440 between DS3 node 1320 and DS1 node 1405, a potential DS3 edge 1445 between DS3 node 1320 and DS3 node 1330, a DS3 edge 1450 between DS3 node 1320 and DS3 node 1330, and a DS1 edge 1455 between DS3 node 1415 and DS1 node 1420. DS1 edges 1440/1455 may be associated with capacity and cost parameters, and may include representations of interconnections between network elements of a physical access network (e.g., network 120). DS1 edges 1440/1455 may serve as carriers of digital signal 1 (DS1) network flows. Potential DS3 edge 1445 may be associated with capacity and cost parameters (e.g., $1000), and may include a representation of a potential interconnection between network elements of a physical access network (e.g., network 120). Potential DS3 edge 1445 may serve as a potential carrier of digital signal 3 (DS3) network flows. DS3 edge 1450 may be established (e.g., based on potential DS3 edge 1445) when wire center 1325 is upgraded to a collocation. DS3 edge 1450 may be associated with capacity and cost parameters (e.g., $1000), and may include a representation of an interconnection between network elements of a physical access network (e.g., network 120). DS3 edge 1450 may serve as a carrier of digital signal 3 (DS3) network flows.

Although FIG. 14 shows exemplary components of partial logical network 1400, in other implementations, partial logical network 1400 may contain fewer, different, differently arranged, or additional components than depicted in FIG. 14. In still other implementations, one or more components of partial logical network 1400 may perform one or more other tasks described as being performed by one or more other components of partial logical network 1400.

Figure 15:
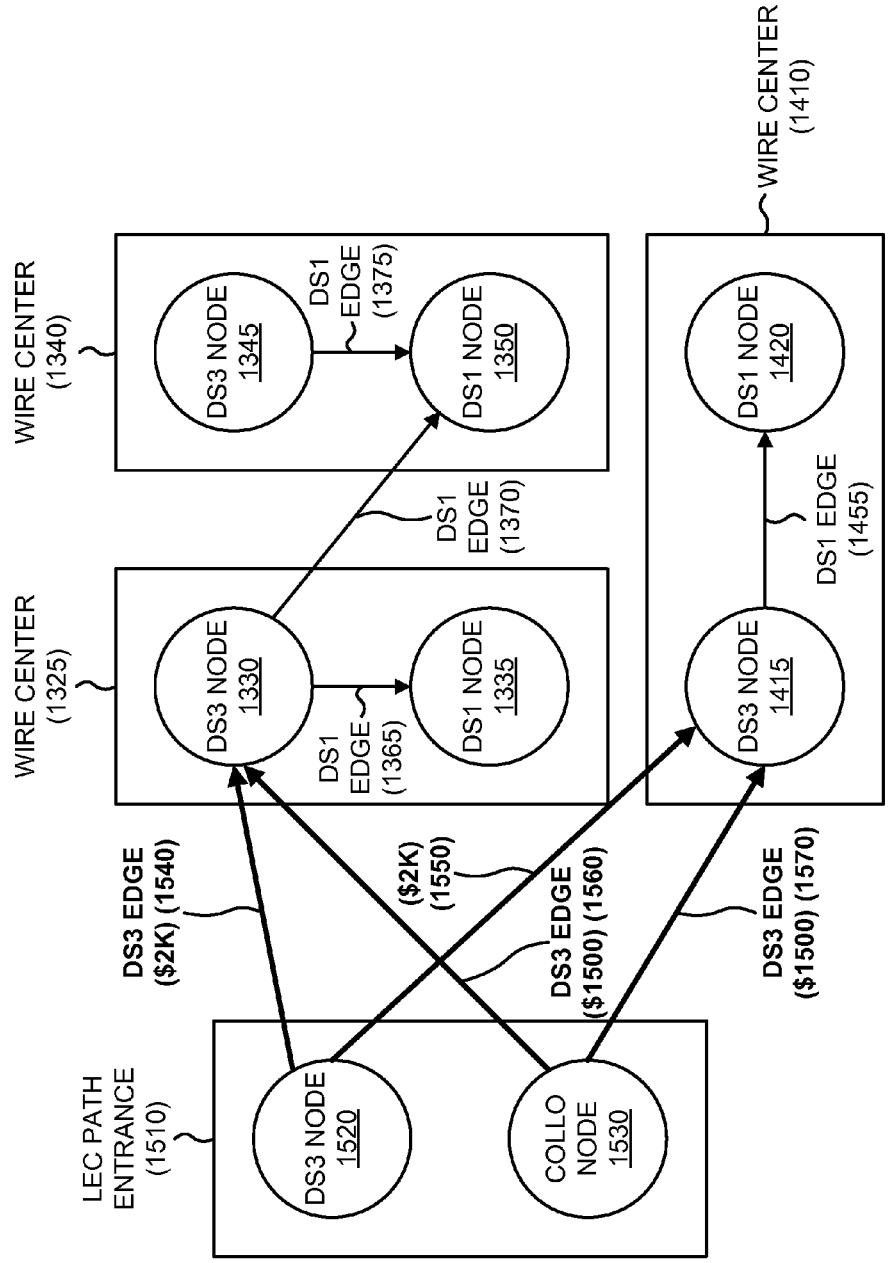
FIG. 15 depicts a diagram of still another partial logical network that may be generated by the MIP model of the device illustrated in FIG. 3.

FIG. 15 depicts a diagram of still another partial logical network 1500 (e.g., when a LEC path entrance is upgraded to a collocation) that may be generated by baseline MIP optimizer 340. As shown, partial logical network 1500 may include wire center 1325 (e.g., that includes DS3 node 1330 and DS1 node 1335), wire center 1340 (e.g., that includes DS3 node 1345 and DS1 node 1350), DS1 edges 1365-1375, and wire center 1410 (e.g., that includes DS3 node 1415, DS1 node 1420, and DS1 edge 1455). Wire center 1325, DS3 node 1330, DS1 node 1335, wire center 1340, DS3 node 1345, DS1 node 1350, DS1 edges 1365-1375, wire center 1410, DS3 node 1415, DS1 node 1420, and DS1 edge 1455 may include the features described above in connection with FIGS. 13 and 14. As further shown in FIG. 15, partial logical network 1500 may include a LEC path entrance 1510 that includes a DS3 node 1520 and a collocation node 1530.

LEC path entrance 1510 may provide representations of a LEC path entrance in the access network. DS3 node 1520 may provide a representation of a DS3 access circuit in the access network. Collocation node 1530 may provide a representation of a collocation in the access network.

Baseline MIP optimizer 340 may provide a DS3 edge 1540 between DS3 node 1520 and DS3 node 1330, a DS3 edge 1550 between DS3 node 1520 and DS3 node 1415, a DS3 edge 1560 between collocation node 1530 and DS3 node 1330, and a DS3 edge 1570 between collocation node 1530 and DS3 node 1415. DS3 edges 1540-1570 may be associated with capacity and cost parameters (e.g., $1500 or $2000), and may include representations of interconnections between network elements of a physical access network (e.g., network 120). DS3 edges 1540-1570 may serve as carriers of digital signal 3 (DS3) network flows.

Although FIG. 15 shows exemplary components of partial logical network 1500, in other implementations, partial logical network 1500 may contain fewer, different, differently arranged, or additional components than depicted in FIG. 15. In still other implementations, one or more components of partial logical network 1500 may perform one or more other tasks described as being performed by one or more other components of partial logical network 1500.

FIG. 16 illustrates a diagram of a portion of an exemplary collocation comparison report 1600 capable of being generated and/or maintained by device 110. As illustrated, collocation comparison report 1600 may include a variety of information associated with access networks. For example, collocation comparison report 1600 may include a description field 1610, a baseline value field 1620, an interactive value field 1630, and/or a variety of entries 1640 associated with fields 1610-1630.

Description field 1610 may include information associated with new collocations provided in a physical access network (e.g., network 120), savings associated with the new collocations, costs associated with the new collocations, etc. For example, description field 1610 may include entries for total number DS1s moved, total number of DS1s re-homed, number of new DS3s, number of re-homed DS3s, cost of new DS3s, total DS1 savings, total DS3 savings, incremental OCn savings, total incremental savings, etc.

Baseline value field 1620 may include baseline value information associated with the descriptions provided in description field 1610. For example, baseline value field 1620 may include entries for "33" DS1s moved, "21" DS1s re-homed, "1" new DS3, "3" re-homed DS3s, a new DS3s cost of $1537.98, a total DS1 savings of $8186.84, a total DS3 savings of $1673.72, etc.

Interactive value field 1630 may include interactive value information associated with the descriptions provided in description field 1610. For example, interactive value field 1630 may include entries for "51" DS1s moved, "7" DS1s re-homed, "5" new DS3s, "5" re-homed DS3s, a new DS3s cost of $4648.95, a total DS1 savings of $11536.74, a total DS3 savings of $4890.75, etc.

Although FIG. 16 shows exemplary information that may be provided in collocation comparison report 1600, in other implementations, collocation comparison report 1600 may contain less, different, or additional information than depicted in FIG. 16.

FIG. 17 depicts a diagram of a portion of an exemplary collocation optimization versus baseline report 1700 capable of being generated and/or maintained by device 110. As illustrated, collocation optimization versus baseline report 1700 may include a variety of information associated with access networks. For example, collocation optimization versus baseline report 1700 may include a LATA field 1705, a number of circuits field 1710, a DS1 inventory cost field 1715, a time field 1720, a baseline savings field 1725, an incremental savings field 1730, a total incremental savings field 1735, a total savings field 1740 and/or a variety of entries 1745 associated with fields 1705-1740.

LATA field 1705 may include identification information associated with a physical access network (e.g., network 120). For example, LATA field 1705 may include numerical identifiers (e.g., "734," "478," etc.) for LATAs.

Number of circuits field 1710 may include a number of circuits associated with the LATA provided in LATA field 1705. For example, number of circuits field 1710 may indicate that LATA "734" (e.g., identified in LATA field 1705) has "88" circuits.

DS1 inventory cost field 1715 may include a cost of DS1 inventory associated with the LATA provided in LATA field 1705. For example, DS1 inventory cost field 1715 may indicate that LATA "734" (e.g., identified in LATA field 1705) has a DS1 inventory cost of $24,168.

Time field 1720 may include a time associated with generating the information for the LATA provided in LATA field 1705. For example, time field 1720 may indicate that it took "00:00:26" to generate the information associated with LATA "734" (e.g., identified in LATA field 1705).

Baseline savings field 1725 may include a baseline savings associated with the LATA provided in LATA field 1705. For example, baseline savings field 1725 may indicate that LATA "734" (e.g., identified in LATA field 1705) has a DS1 baseline savings of $8,187 and a DS3 baseline savings of $1,674.

Incremental savings field 1730 may include an incremental savings associated with the LATA provided in LATA field 1705. For example, incremental savings field 1730 may indicate that LATA "734" (e.g., identified in LATA field 1705) has a DS1 incremental savings of $2,055 and a DS3 incremental savings of $1,087.

Total incremental savings field 1735 may include an incremental savings associated with the LATA provided in LATA field 1705. For example, total incremental savings field 1735 may indicate that LATA "734" (e.g., identified in LATA field 1705) has a total incremental savings of $3,142.

Total savings field 1740 may include an incremental savings associated with the LATA provided in LATA field 1705. For example, total savings field 1740 may indicate that LATA "734" (e.g., identified in LATA field 1705) has a total savings of $13,001.

Although FIG. 17 shows exemplary information that may be provided in collocation optimization versus baseline report 1700, in other implementations, collocation optimization versus baseline report 1700 may contain less, different, or additional information than depicted in FIG. 17.

FIGS. 18-23 illustrate flow charts of an exemplary process 1800 for determining collocations with an access transport management system (ATMS) according to implementations described herein. In one implementation, process 1800 may be performed by device 110. In another implementation, some or all of process 1800 may be performed by another device or group of devices, including or excluding device 110.

Figure 18:
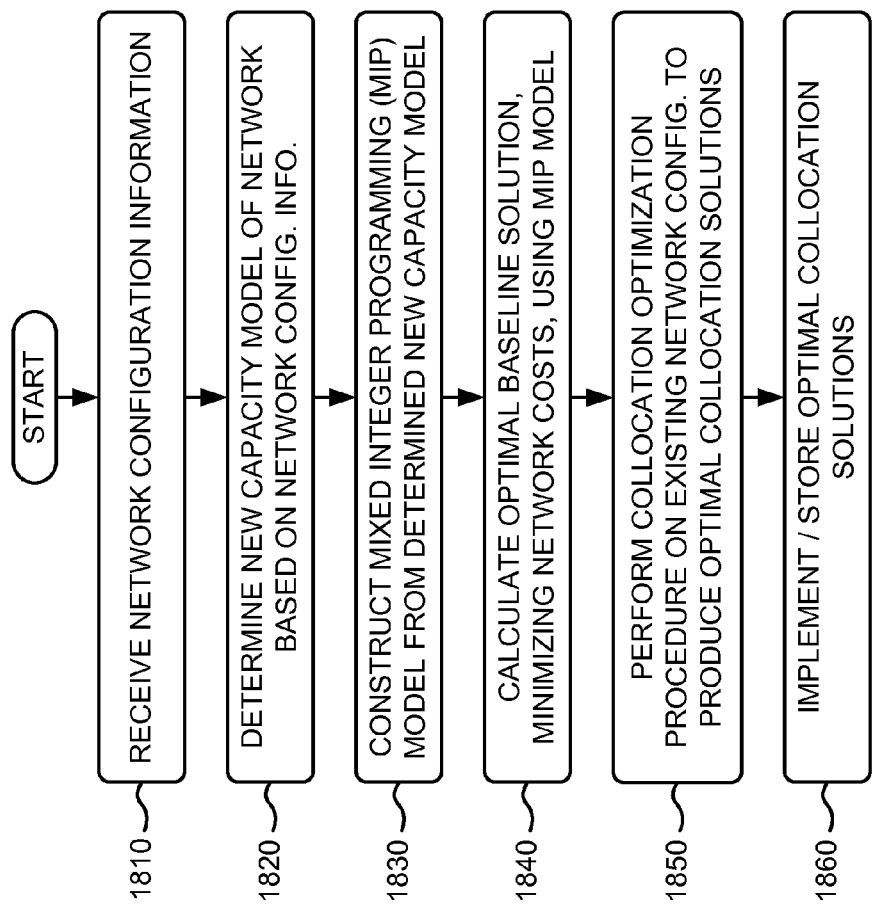

As illustrated in FIG. 18, process 1800 may begin with receipt of network configuration information from a network (block 1810), and determining a new capacity model of the network based on the network configuration information (block 1820). For example, in implementations described above in connection with FIGS. 1 and 3, device 110 may receive network configuration information 130 from network 120. Network configuration information 130 may include information associated with network 120, such as the number of network elements, operational states of the network elements, routing information, interconnection information, cost information, etc. New capacity model 300 of device 110 may receive network configuration information 130, and may create a partial logical network (e.g., a new capacity model) that may be relevant to new capacity.

As further shown in FIG. 18, a mixed integer programming (MIP) model may be constructed from the determined new capacity model (block 1830), and an optimal baseline solution, minimizing network costs, may be calculated using the MIP model (block 1840). For example, in implementations described above in connection with FIG. 3, baseline MIP optimizer 340 of device 110 may receive a new capacity model (e.g., from new capacity model 300), an entrance facility capacity model (e.g., from entrance facility capacity model 310), and an incumbent capacity model (e.g., from incumbent capacity model 320) in the form of logical network 330. Baseline MIP optimizer 340 may receive logical network 330, may construct the MIP model based on logical network 330, and may calculate optimal baseline solution 360 using the MIP model. Optimal baseline solution 360 may include a solution that provides an existing baseline configuration for an access network (e.g., network 120) at a least total expense.

Returning to FIG. 18, a collocation optimization procedure may be performed on an existing (or current) network configuration to produce optimal collocation solutions (block 1850), and the optimal collocation solutions may be implemented in the network and/or stored (block 1860). For example, in implementations described above in connection with FIGS. 1 and 3, collocation MIP optimizer 350 of device 110 may receive optimal baseline solution 360 from baseline MIP optimizer 340, may perform a collocation optimization procedure against an existing baseline configuration of the access network (e.g., as provided by optimal baseline solution 360) to produce optimal collocation solutions 140. Optimal collocation solutions 140 may include information for identifying new collocation locations and for performing network 120 planning in an optimal way (e.g., in a manner that minimizes access transport costs). Device 110 may store optimal collocation solutions 140, and/or may provide optimal collocation solutions 140 to network 120. Network 120 may receive optimal collocation solutions 140, and may implement optimal collocation solutions 140 (e.g., via the network elements).

Figure 19:
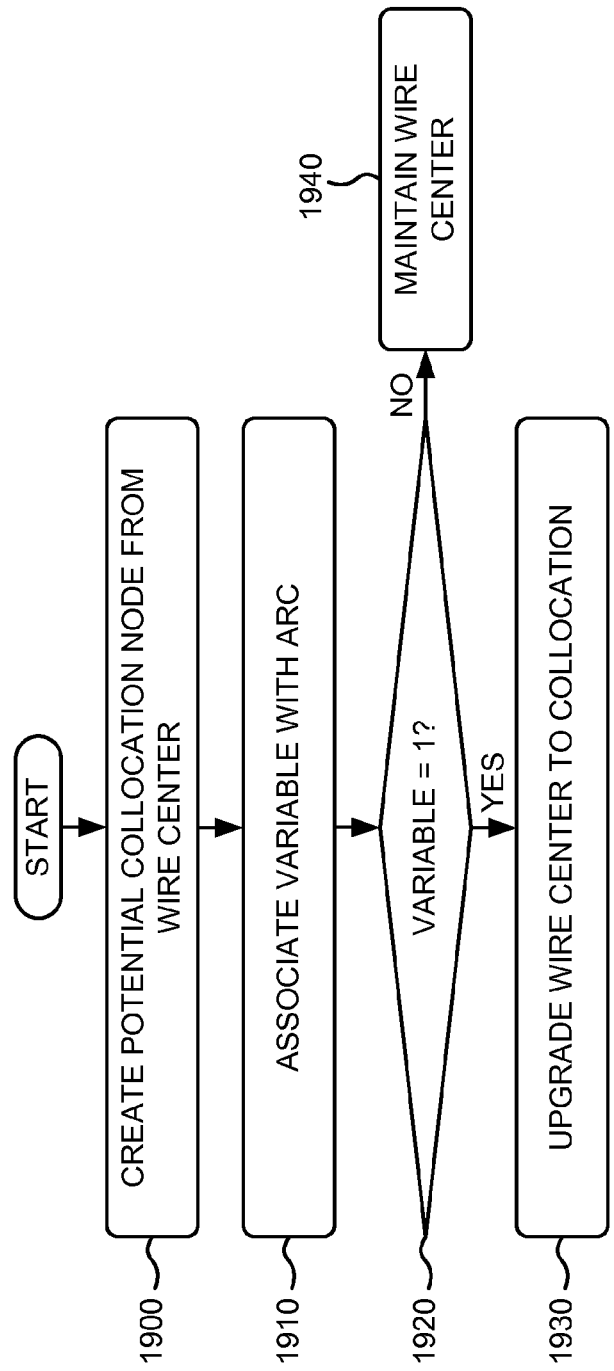

Process block 1820 may include the process blocks depicted in FIG. 19. As shown in FIG. 19, process block 1820 may include creating a potential collocation node from a wire center (block 1900), associating a variable with an arc (e.g., provided to the potential collocation node) (block 1910), and determining whether the variable equals one (block 1920). If the variable equals one (block 1920—YES), the wire center may be upgraded to a collocation (block 1930). Otherwise (block 1920—NO), the wire center may be maintained (block 1940). For example, in implementations described above in connection with FIG. 4, first DS1 arc 420 may be provided between source node (S1) 400 and the potential collocation node (AAA_COL) of wire center 410, and may correspond to a DS1 segment (e.g., S1/AAA_COL) in the physical access network. A binary variable (z) may be associated with first DS1 arc 420. If the binary variable (z) is equal to one (1), wire center 410 may be upgraded to a collocation. If the binary variable (z) does not equal to one (1), wire center 410 may remain as a wire center.

Figure 20:
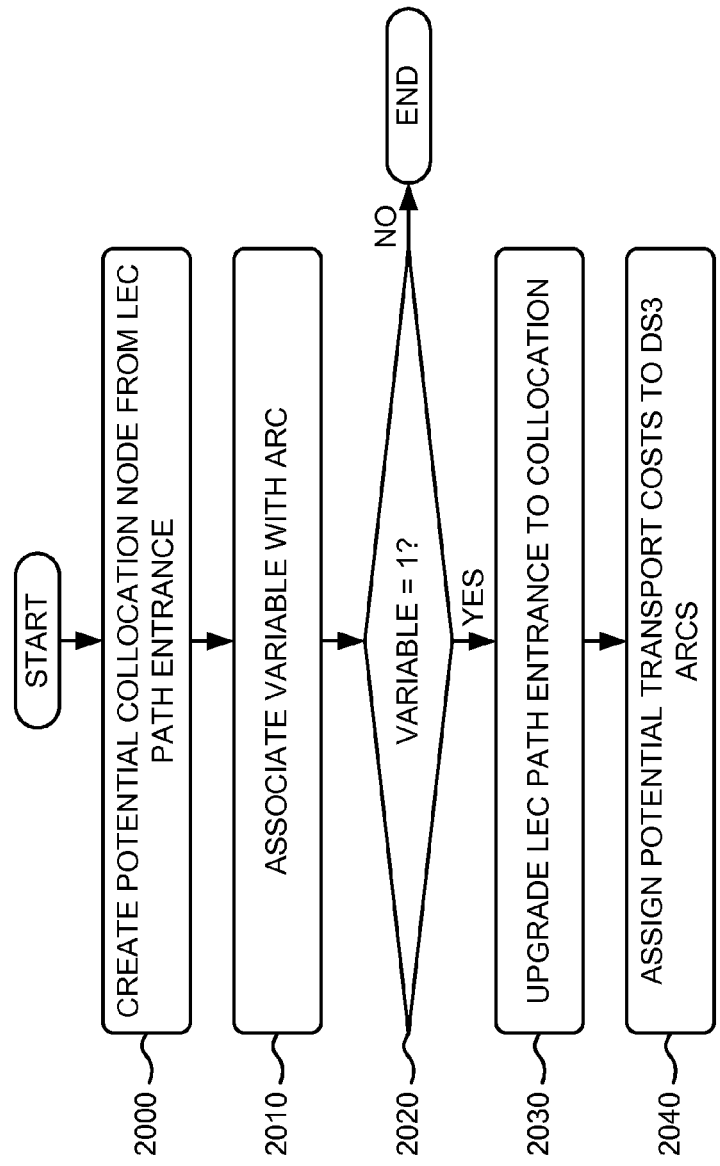

Alternatively and/or additionally, process block 1820 may include the process blocks depicted in FIG. 20. As shown in FIG. 20, process block 1820 may include creating a potential collocation node from a LEC path entrance (block 2000), associating a variable with an arc (e.g., to the potential collocation node) (block 2010), and determining whether the variable equals one (block 2020). If the variable equals one (block 1920—YES), the LEC path entrance may be upgraded to a collocation (block 2030) and potential transport costs may be assigned to DS3 arcs (block 2040). Otherwise (block 2020—NO), process block 1820 may cease.

For example, in implementations described above in connection with FIG. 5, first DS1 arc 520 may be provided between source node (S1) 500 and a node (AAA) of LEC path entrance 510, and may correspond to a DS1 segment (e.g., S1/AAA) in the physical access network. Second DS1 arc 520 may be provided between source node (S1) 500 and the potential collocation node (AAA_COL) of LEC path entrance 510, and may correspond to a DS1 segment (e.g., S1/AAA_COL) in the physical access network. A binary variable (z) may be associated with the second DS1 arc 520. If the binary variable (z) is equal to one (1), LEC path entrance 510 may be upgraded to a collocation. If the binary variable (z) does not equal to one (1), LEC path entrance 510 may remain as a LEC path entrance. First DS3 arc 530 may be provided between a node (AAA) of LEC path entrance 510 and another node (AAA_3LC) of LEC path entrance 510, and may be derived from a DS3 segment (e.g., AAA/AAA_3LC) in the physical access network. Another DS3 arc 530 may be provided between the potential collocation node (AAA_COL) of LEC path entrance 510 and another node (AAA_3LC) of wire center, and may be derived from a DS3 segment (e.g., AAA_COL/AAA_3LC) in the physical access network. A cost for each DS3 access line may include a transport cost of a corresponding segment plus a demultiplexer charge.

Figure 21:
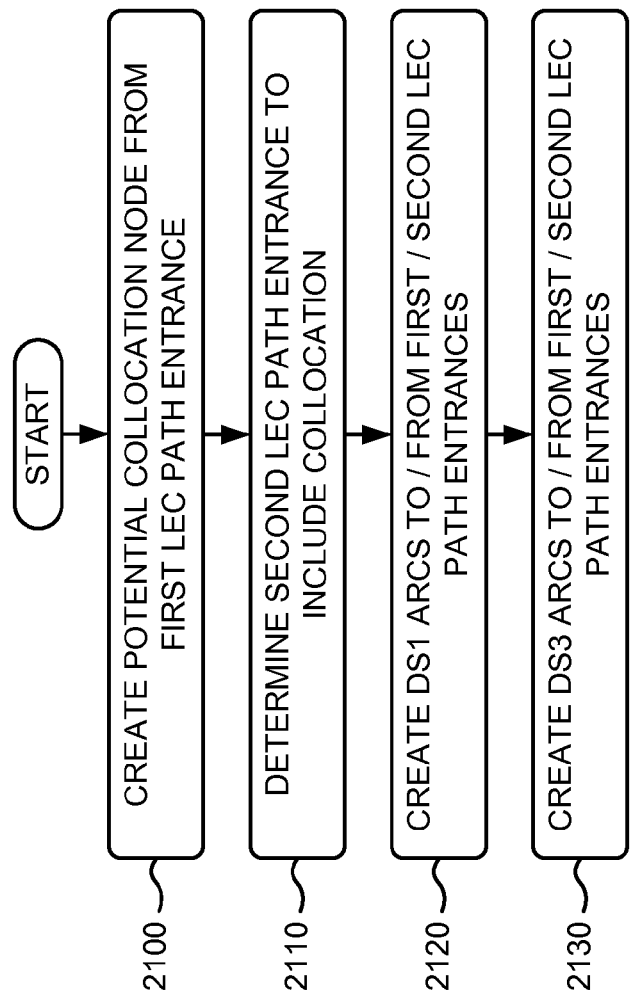

Alternatively and/or additionally, process block 1820 may include the process blocks depicted in FIG. 21. As shown in FIG. 21, process block 1820 may include creating a potential collocation node from a first LEC path entrance (block 2100), determining a second path entrance to include a collocation (block 2110), creating DS1 arcs to/from the first and second LEC path entrances (block 2120), and creating DS3 arcs to/from the first and second LEC path entrances. For example, in implementations described above in connection with FIG. 6, entrance facility 620 may be of location type "1" (i.e., entrance facility 620 may include an existing LEC path entrance that is upgradable to a collocation), and entrance facility 625 may be of location type "2" or "3" (i.e., entrance facility 625 may include a collocation). DS3 arcs 645 may be provided between a collocation node (ent1_COL) of entrance facility 620 and another node (ent1_3LC) of entrance facility 620, between a node (ent1) of entrance facility 620 and a node (eof1_3LC) of end office 630, between a collocation node (ent1_COL) of entrance facility 620 and a node (eof1_3LD) of end office 630, and between a node (ent2) of entrance facility 625 and a node (eof2_3LC) of end office 635. Based on DS1 segment information, new capacity model 300 may create a variety of DS1 arcs (e.g., DS1 arcs 640) between entrance facility 620 and end office 630, between entrance facility 625 and end office 635, and between end offices 635.

Figure 22:
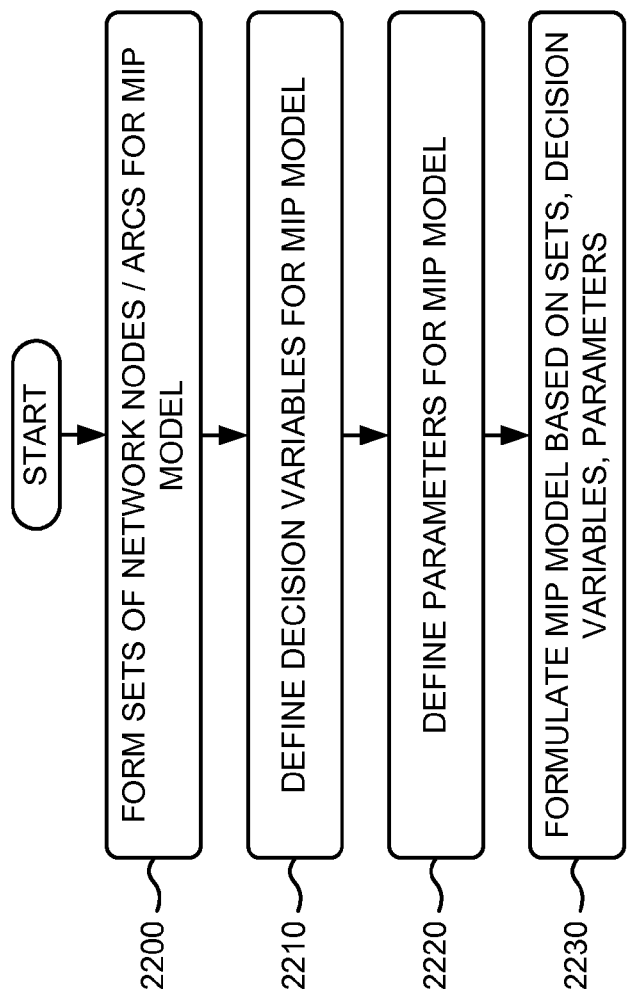

Process block 1830 may include the process blocks depicted in FIG. 22. As shown in FIG. 22, process block 1830 may include forming sets of network nodes and/or arcs for the MIP model (block 2200), defining decision variables for the MIP model (block 2210), defining parameters for the MIP model (block 2220), and formulating the MIP model based on the sets, the decision variables, and the parameters (block 2230). For example, in implementations described above in connection with FIG. 9, set formation logic 900 of device 110 may create sets 940 based on logical network 330. In one example, sets 940 may include a set of nodes, a set of DS1 arcs, a set of DS3 arcs, a set of all arcs, a set of arcs arriving at a node, and a set of arcs departing from a node. Variable definer logic 910 of device 110 may define variables 950 based on logical network 330. In one example, variables 950 may include sets of decision variables defined to capture a decision. Parameter definer logic 920 of device 110 may define parameters 960 based on logical network 330. In one example, parameters 960 may include a demand for a node, a lower bound for units of flow that may be shipped on an arc, an upper bound for units of flow that may be shipped on an arc, a cost incurred for sending one unit of flow (e.g., a circuit) over a DS1 arc, and a cost of constructing a new DS3 access line over an arc. Model formulation logic 930 of device 110 may receive sets 940, variables 950, and parameters 960, and may formulate baseline MIP optimizer 340 and optimal baseline solution 360 based on sets 940, variables 950, and parameters 960.

Process block 1850 may include the process blocks depicted in FIG. 23. As shown in FIG. 23, process block 1850 may include one of performing an automatic collocation optimization procedure on the existing network configuration, using the optimal baseline solution, to produce a ranked list of candidate collocation solutions (block 2300), or performing an interactive collocation optimization procedure on the existing network configuration and user-proposed new collocations, using the optimal baseline solution, to produce a total incremental savings for the user-proposed new collocations (block 2310). For example, in implementations described above in connection with FIG. 10, automatic collocation optimizer 1000 of device 110 may receive optimal baseline solution 360 from baseline MIP optimizer 340, and may automatically determine ranked list of candidate solutions 1030 (e.g. a best set of new collocations) based on optimal baseline solution 360. Interactive collocation optimizer 1010 of device 110 may receive optimal baseline solution 360 from baseline MIP optimizer 340, and may receive (e.g., from network engineers) one or more designated sites as new collocations. Interactive collocation optimizer 1010 may analyze optimal baseline solution 360 and the suggested new collocations, and may generate a total savings 1040 for the new collocations based on the analysis.

Systems and/or methods described herein may receive network configuration information from a network (e.g., an access network), and may determine a new capacity model of the network based on the network configuration information. The systems and/or methods may construct a mixed integer programming (MIP) model from the determined new capacity model, and may calculate an optimal baseline solution, minimizing network costs, using the MIP model. The systems and/or methods may perform a collocation optimization procedure against an existing baseline configuration of the access network (e.g., as provided by the optimal baseline solution) to produce optimal collocation solutions, and may implement (e.g., within the access network) and/or store the optimal collocation solutions.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 18-23, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, the method comprising:
  receiving, by a processor of the computing device, network configuration information from a network,
    the network configuration information including operational states of network elements associated with the network;
  determining, by the processor, a logical network based on the network configuration information,
    the logical network including a new capacity model of the network, an entrance facility capacity model of the network, and an incumbent capacity model of the network,
    determining the logical network including:
      determining the new capacity model of the network by:
        creating a potential collocation node based on a first local exchange carrier (LEC) path entrance of the network,
        determining a second local exchange carrier (LEC) path entrance of the network to include a collocation,
        providing digital signal 1 (DS1) arcs to and from the first local exchange carrier (LEC) path entrance and the second local exchange carrier (LEC) path entrance, and
        providing digital signal 3 (DS3) arcs to and from the first local exchange carrier (LEC) path entrance and the second local exchange carrier (LEC) path entrance;
  constructing, by the processor, a mixed integer programming (MIP) model based on the new capacity model, the entrance facility capacity model, and the incumbent capacity model of the logical network;
  calculating, by the processor, an optimal baseline solution, that minimizes network costs, using the mixed integer programming (MIP) model;
  performing, by the processor, an automatic collocation optimization procedure, on an existing configuration of the network and based on the optimal baseline solution, to produce a ranked list of optimal collocation solutions for the network; and
  providing the ranked list of optimal collocation solutions to the network for implementation.

2. The computing device-implemented method of claim 1, further comprising:
  storing the optimal collocation solutions.

3. The computing device-implemented method of claim 1, where determining a logical network based on the network configuration information comprises:
  determining the new capacity model of the network based on the network configuration information,
  determining the entrance facility capacity model of the network based on the network configuration information, and
  determining the incumbent capacity model of the network based on the network configuration information; and
  constructing a mixed integer programming (MIP) model comprises constructing the mixed integer programming (MIP) model based on the new capacity model, the entrance facility capacity model, and the incumbent capacity model.

4. The computing device-implemented method of claim 3, where determining the new capacity model of the network comprises:

creating a potential collocation node based on a wire center of the network;
associating a variable with an arc provided to the potential collocation node;
upgrading the wire center to a collocation when the variable equals one; and
maintaining the wire center as a wire center when the variable does not equal one.

5. The computing device-implemented method of claim 3, where determining the new capacity model of the network comprises:
creating a potential collocation node based on a local exchange carrier (LEC) path entrance of the network;
associating a variable with an arc provided to the potential collocation node; upgrading the local exchange carrier (LEC) path entrance to a collocation when the variable equals one; and
maintaining the local exchange carrier (LEC) path entrance as a local exchange carrier (LEC) path entrance when the variable does not equal one.

6. The computing device-implemented method of claim 1, where constructing a mixed integer programming (MIP) model comprises:
forming sets of network nodes and arcs for the mixed integer programming (MIP) model;
defining decision variables for the mixed integer programming (MIP) model;
defining parameters for mixed integer programming (MIP) model; and
formulating the mixed integer programming (MIP) model based on the sets, the decision variables, and the parameters.

7. The computing device-implemented method of claim 1, where performing a collocation optimization procedure comprises:
performing an interactive collocation optimization procedure, on the existing configuration of the network, to produce a total savings for new collocations.

8. The computing device-implemented method of claim 1, where the network comprises an access network.

9. The computing device-implemented method of claim 1, where the network configuration information further comprises one or more of:
a number of the network elements associated with the network;
routing information associated with the network;
interconnection information associated with the network; or
cost information associated with the network.

10. The computing device-implemented method of claim 1, where the computing device comprises one or more of:
a laptop;
a personal computer;
a workstation; or
a server.

11. The computing device-implemented method of claim 1, where the optimal collocation solutions comprise information for identifying new collocation locations and for performing network planning in a manner that minimizes access transport costs.

12. A device comprising:
a memory to store a plurality of instructions; and
a processor to execute instructions in the memory to:
receive network configuration information from a network, the network being associated with a plurality of network elements, and the network configuration information including an operational state of each of the plurality of network elements,
determine a new capacity model of the network based on the network configuration information, the processor, when determining the new capacity model, being to:
create a potential collocation node based on a first local exchange carrier (LEC) path entrance of the network,
determine a second local exchange carrier (LEC) path entrance of the network to include a collocation,
provide digital signal 1 (DS1) arcs to and from the first local exchange carrier (LEC) path entrance and the second local exchange carrier (LEC) path entrance, and
provide digital signal 3 (DS3) arcs to and from the first local exchange carrier (LEC) path entrance and the second local exchange carrier (LEC) path entrance,
determine an entrance facility capacity model of the network based on the network configuration information,
determine an incumbent capacity model of the network based on the network configuration information,
construct a mixed integer programming (MIP) model based on the new capacity model, the entrance facility capacity model, and the incumbent capacity model of the network,
calculate an optimal baseline solution, that minimizes network costs, using the mixed integer programming (MIP) model,
perform a collocation optimization procedure, on an existing configuration of the network and based on the optimal baseline solution, to produce a ranked list of optimal collocation solutions for the network, and
provide the ranked list of optimal collocation solutions to the network for implementation.

13. The device of claim 12, where the new capacity model, the entrance facility capacity model, and the incumbent capacity model of the network are part of a logical network that models the network.

14. The device of claim 12, where the device comprises one or more of:
a laptop;
a personal computer;
a workstation; or
a server.

15. The device of claim 12, where the network comprises an access network.

16. The device of claim 12, where the network configuration information further comprises one or more of:
information identifying a quantity of the plurality of network elements associated with the network,
routing information associated with the network, interconnection information associated with the network, or cost information associated with the network.

17. The device of claim 12, where the optimal collocation solutions comprise information for identifying new collocation locations and for performing network planning in a manner that minimizes access transport costs.

18. The device of claim 12, where the processor is further to execute instructions in the memory to:
store the optimal collocation solutions.

19. The device of claim 12, where the entrance facility capacity model of the network comprises a partial logical network relevant to an entrance facility capacity of the network.

20. The device of claim 12, where the processor is further to execute instructions in the memory to:

create a potential collocation node based on a wire center of
the network,
associate a variable with an arc provided to the potential
collocation node,
upgrade the wire center to a collocation when the variable
equals one, and
maintain the wire center as a wire center when the variable
does not equal one.

21. The device of claim 12, where the processor is further to execute instructions in the memory to:
create a potential collocation node based on a local exchange carrier (LEC) path entrance of the network,
associate a variable with an arc provided to the potential collocation node, upgrade the local exchange carrier (LEC) path entrance to a collocation when the variable equals one, and
maintain the local exchange carrier (LEC) path entrance as a local exchange carrier (LEC) path entrance when the variable does not equal one.

22. The device of claim 12, where the processor is further to execute instructions in the memory to one of:
perform an automatic collocation optimization procedure, on the existing configuration of the network, to produce a ranked list of collocation solutions, or
perform an interactive collocation optimization procedure, on the existing configuration of the network, to produce a total savings for new collocations.

23. A system comprising:
an access network comprising:
a plurality of network elements, and
a plurality of links interconnecting the network elements; and
a device to:
receive, from the network, network configuration information associated with the plurality of network elements and the plurality of links, the network configuration information including operational states of the plurality of network elements and the plurality of links,
determine a new capacity model of the network based on the network configuration information, the device, when determining the new capacity model, being to:
create a potential collocation node based on a first local exchange carrier (LEC) path entrance of the network,
determine a second local exchange carrier (LEC) path entrance of the network to include a collocation,
provide digital signal 1 (DS1) arcs to and from the first local exchange carrier (LEC) path entrance and the second local exchange carrier (LEC) path entrance, and
provide digital signal 3 (DS3) arcs to and from the first local exchange carrier (LEC) path entrance and the second local exchange carrier (LEC) path entrance,
determine an entrance facility capacity model of the network based on the network configuration information,
determine an incumbent capacity model of the network based on the network configuration information,
construct a mixed integer programming (MIP) model based on the new capacity model, the entrance facility capacity model, and the incumbent capacity model of the network,
calculate an optimal baseline solution, that minimizes network costs, using the MIP model,
perform a collocation optimization mapping procedure, on an existing configuration of the access network and based on the optimal baseline solution, to produce a ranked list of optimal collocation solutions for the access network, and
provide the ranked list of optimal collocation solutions to the access network for implementation by the plurality of network elements and the plurality of links.

\* \* \* \* \*